US010715489B2

(12) United States Patent
Uchida et al.

(10) Patent No.: US 10,715,489 B2
(45) Date of Patent: Jul. 14, 2020

(54) MANAGEMENT SERVER, CONNECTION SUPPORT METHOD, AND NON-TRANSITORY COMPUTER-READABLE RECORDING MEDIUM ENCODED WITH CONNECTION SUPPORT PROGRAM

(71) Applicant: Konica Minolta, Inc., Chiyoda-ku (JP)

(72) Inventors: Hisashi Uchida, Kuze-gun (JP); Kazumi Sawayanagi, Itami (JP); Noriaki Asamoto, Kusatsu (JP); Masami Yamada, Sennan-gun (JP); Shuji Yoneda, Osaka (JP); Kazuya Anezaki, Itami (JP); Akihiro Torigoshi, Itami (JP); Yasutaka Ito, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 51 days.

(21) Appl. No.: 14/614,921

(22) Filed: Feb. 5, 2015

(65) Prior Publication Data

US 2015/0244674 A1 Aug. 27, 2015

(30) Foreign Application Priority Data

Feb. 21, 2014 (JP) .................... 2014-031789

(51) Int. Cl.
*H04L 29/06* (2006.01)
*H04L 12/24* (2006.01)
*H04L 29/12* (2006.01)

(52) U.S. Cl.
CPC .......... *H04L 63/02* (2013.01); *H04L 41/0816* (2013.01); *H04L 63/029* (2013.01);
(Continued)

(58) Field of Classification Search
CPC ............ H04L 9/00; G06F 21/00; G05B 21/00
See application file for complete search history.

(56) References Cited

U.S. PATENT DOCUMENTS

2007/0214501 A1* 9/2007 Muramoto .......... H04L 63/0236
726/11
2012/0050796 A1 3/2012 Yokokura
(Continued)

FOREIGN PATENT DOCUMENTS

| CN | 101040497 A | 9/2007 |
|---|---|---|
| JP | 2012-053624 A | 3/2012 |
| JP | 2012-063944 A | 3/2012 |

OTHER PUBLICATIONS

First Office Action issued by the State Intellectual Property Office of the People's Republic of China dated Sep. 1, 2017 in corresponding Chinese Application No. 2015100852449 with English language translation (16 pages).
(Continued)

*Primary Examiner* — Joseph P Hirl
*Assistant Examiner* — Leynna Truvan
(74) *Attorney, Agent, or Firm* — Buchanan Ingersoll & Rooney PC

(57) ABSTRACT

A management server disposed outside a firewall and supporting connection of communications between a control target device disposed inside the firewall and a cloud server disposed outside the firewall, includes a server-side session establishing portion to, based on a request from a relay device disposed inside the firewall, establish a session with the relay device, a device information acquiring portion to acquire device information about the control target device from the relay device via the established session, and an update determining portion to, in response to reception of a request of connecting to the control target device from the cloud server, determine whether to update the device infor-
(Continued)

mation. The device information acquiring portion includes an upon-session-establishment acquiring portion to acquire the device information when a session with the relay device is established, and an upon-session-request acquiring portion to acquire the device information after updating the device information is determined.

24 Claims, 13 Drawing Sheets

(52) U.S. Cl.
CPC ........ *H04L 61/256* (2013.01); *H04L 61/2514* (2013.01); *H04L 61/2592* (2013.01)

(56) References Cited

U.S. PATENT DOCUMENTS

| | | | |
|---|---|---|---|
| 2012/0054851 A1 | 3/2012 | Piazza et al. | |
| 2012/0062946 A1 | 3/2012 | Kitagata | |
| 2012/0069131 A1* | 3/2012 | Abelow | G06Q 10/067 348/14.01 |
| 2014/0379801 A1* | 12/2014 | Gupta | H04L 67/306 709/204 |

OTHER PUBLICATIONS

Second Office Action issued by the State Intellectual Property Office of the People's Republic of China dated May 30, 2018 in corresponding Chinese Application No. 2015100852449 with English language translation (18 pages).

\* cited by examiner

MANAGEMENT SERVER, CONNECTION SUPPORT METHOD, AND NON-TRANSITORY COMPUTER-READABLE RECORDING MEDIUM ENCODED WITH CONNECTION SUPPORT PROGRAM

This application is based on Japanese Patent Application No. 2014-031789 filed with Japan Patent Office on Feb. 21, 2014, the entire content of which is hereby incorporated by reference.

BACKGROUND OF THE INVENTION

Field of the Invention

The present invention relates to a management server, a connection support method, and a non-transitory computer-readable recording medium encoded with a connection support program. More particularly, the present invention relates to a management server which supports communications between a device located outside a firewall and a device located inside the firewall, a connection support method which is executed by the management server, and a non-transitory computer-readable recording medium encoded with a connection support program which is executed by the management server.

Description of the Related Art

A multi-function peripheral (hereinafter, referred to as "MFP") which is connected to a local area network (LAN) may be controlled by using a service provided from a cloud server which is connected to the Internet. For example, an MFP may be caused to print data stored in a cloud server. However, it is often the case that an MFP is connected to a LAN and the LAN is connected to the Internet via a firewall. Therefore, an access from the cloud server to the MFP may be blocked by the firewall.

Japanese Patent Laid-Open No. 2012-063944 discloses a print server which includes: a list request receiving unit which receives a printer list request from a client terminal; an acquisition unit which sends a status acquisition request to a printer and acquires the status indicating whether the printer is available for printing; and a sending unit which sends, to the client terminal that has sent the printer list request, data of a printer list described in a format for display on a Web browser of the client terminal, using the status of the printer that has been acquired by the acquisition unit. When the status of the printer cannot be acquired in the acquisition unit, the sending unit sends the data of the printer list by adding thereto a command which allows the Web browser of the client terminal to inquire the status of the printer whose status has not been acquired.

In the conventional printing system, however, the client terminal needs to be connected to a LAN to which the printer is connected. Further, since the client terminal has to perform the processing that should be originally performed by the print server it takes time to acquire the data of the printer list, and there is a problem of a delayed response.

SUMMARY OF THE INVENTION

An aspect of the present invention provides a management server disposed outside a firewall and capable of supporting connection of communications between a control target device disposed inside the firewall and a cloud server disposed outside the firewall, wherein the management server includes: a server-side session establishing portion to, on the basis of a request from a relay device disposed inside the firewall, establish a communication session with the relay device; a device information acquiring portion to acquire device information about the control target device from the relay device via the established communication session; and an update determining portion to, in response to reception of a connection request of connecting to the control target device from the cloud server, determine whether to update the device information, wherein the device information acquiring portion includes an upon-session-establishment acquiring portion to acquire the device information from the relay device upon establishment of a communication session with the relay device by the server-side session establishing portion, and an upon-session-request acquiring portion to acquire the device information from the relay device after it is determined by the update determining portion to update.

Another aspect of the present invention provides a management server disposed outside a firewall and capable of supporting connection of communications between a control target device disposed inside the firewall and a cloud server disposed outside the firewall, wherein the management server includes: a device information acquiring portion to acquire device information about the control target device from the relay device disposed inside the firewall; an executability determining portion to determine, on the basis of the device information acquired by the device information acquiring portion, executability of a process specified by control information indicating contents to control the control target device and being included in a connection request received from the cloud server; and an update determining portion to determine whether to update the device information at a stage before the executability is determined by the executability determining portion, wherein in the case where it is determined by the update determining portion to update, the executability determining portion determines the executability on the basis of the device information acquired by the device information acquiring portion after the connection request has been received from the cloud server, and in the case where it is determined by the update determining portion not to update, the executability determining portion determines the executability on the basis of the device information acquired by the device information acquiring portion before the connection request is received from the cloud server.

A further aspect of the present invention provides a connection support method performed by a management server disposed outside a firewall and capable of supporting connection of communications between a control target device disposed inside the firewall and a cloud server disposed outside the firewall, wherein the connection support method includes: a server-side session establishing step of, on the basis of a request from a relay device disposed inside said firewall, establishing a communication session with the relay device; a device information acquiring step of acquiring device information about the control target device from the relay device via the established communication session; and an update determining step of, in response to reception of a connection request of connecting to the control target device from the cloud server, determining whether to update the device information, wherein the device information acquiring step includes an upon-session-establishment acquiring step of acquiring the device information from the relay device upon establishment of a communication session with the relay device in said server-side session establishing step, and an upon-session-request acquiring step of acquiring the device information from the relay device after it is determined in the update determining step to update.

A further aspect of the present invention provides a connection support method performed by a management server disposed outside a firewall and capable of supporting connection of communications between a control target device disposed inside the firewall and a cloud server disposed outside the firewall, the connection support method includes: a device information acquiring step of acquiring device information about the control target device from the relay device disposed inside the firewall; an executability determining step of determining, on the basis of the device information acquired in the device information acquiring step, executability of a process specified by control information indicating contents to control the control target device and being included in a connection request received from the cloud server, and an update determining step of determining whether to update the device information at a stage before the executability is determined in the executability determining step, wherein the executability determining step includes a step of determining, in the case where it is determined to update in the update determining step, the executability on the basis of the device information acquired in the device information acquiring step after the connection request has been received from the cloud server, and the executability determining step includes a step of determining, in the case where it is determined not to update in said update determining step, the executability on the basis of the device information acquired in the device information acquiring step before the control request is received from the cloud server.

The foregoing and other features, aspects, and advantages of the present invention will become more apparent from the following detailed description of the present invention when taken in conjunction with the accompanying drawings.

DESCRIPTION OF THE PREFERRED EMBODIMENTS

Figure 1:
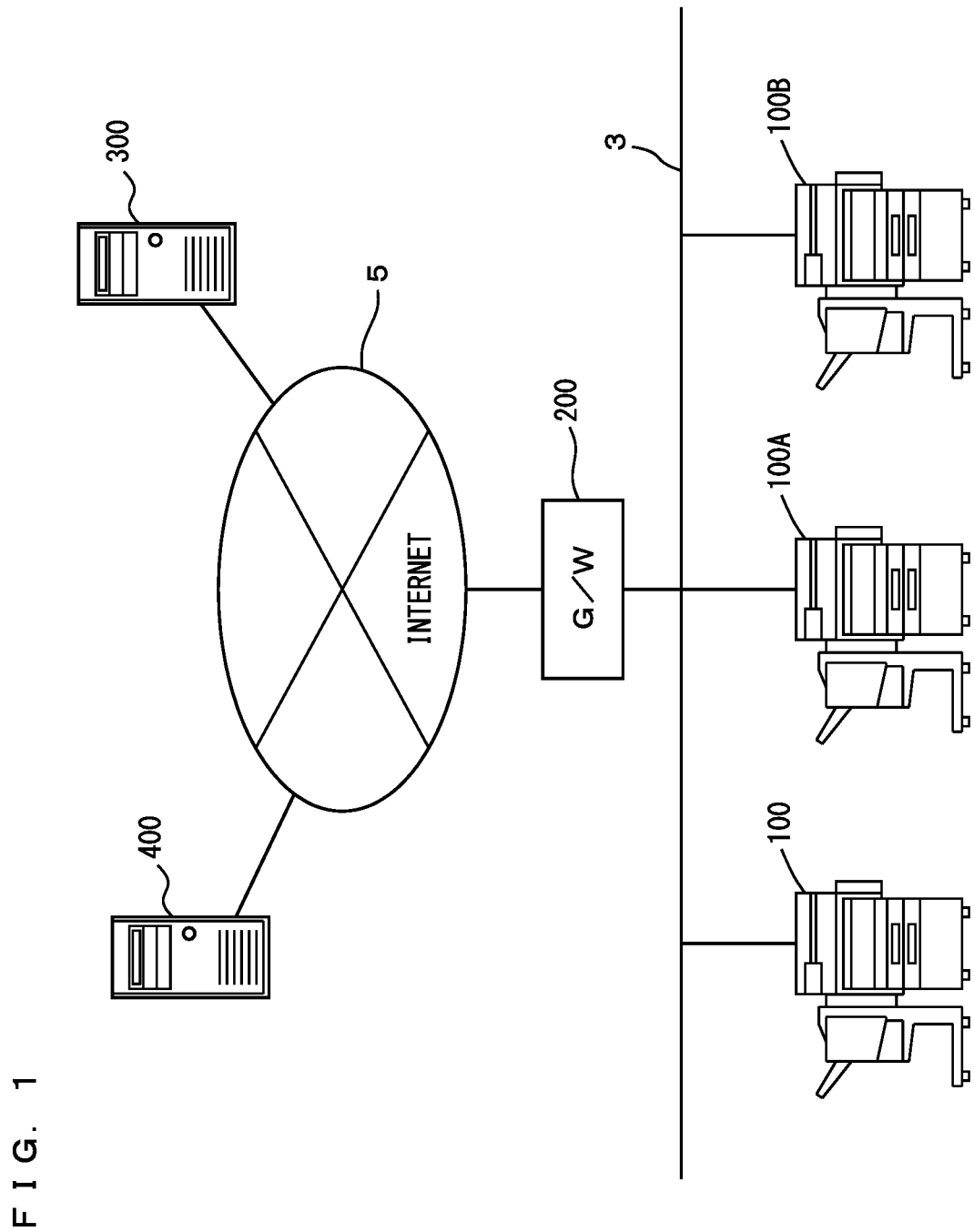
FIG. 1 schematically shows, by way of example, an information processing system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows, by way of example, an information processing system according to an embodiment of the present invention.

Referring to FIG. 1, the information processing system includes a management server 300, a gateway (G/W) device 200 which functions as a relay device, and multi-function peripherals (MFPs) 100, 100A, and 100B. Management server 300 and gateway device 200 are each connected to the Internet 5, and they can communicate with each other via Internet 5. Further, management server 300 and gateway device 200 each can communicate with another computer which is connected to Internet 5. Here, a cloud server 400 is shown as an example of such another computer connected to Internet 5.

Further, gateway device 200 is connected to a local area network (LAN) 3, and MFPs 100, 100A, and 100B are also connected to LAN 3. Gateway device 200 can communicate with MFPs 100, 100A, and 100B connected to LAN 3. Further, gateway device 200 and MFPs 100, 100A, and 100B each can communicate with another computer which is connected to LAN 3.

Gateway device 200 has a firewall function, and connects LAN 3, which is located inside the firewall, with Internet 5, which is located outside the firewall. Gateway device 200 restricts accesses from management server 300 and cloud server 400, which are connected to Internet 5, to MFPs 100, 100A, and 100B, which are connected to LAN 3. The firewall function of gateway device 200 is not limited to a particular type, but it may be a packet filtering firewall function which determines whether to permit a communication or not on the basis of an address included in a packet. Alternatively, it may be an application-layer gateway firewall function which is a proxy that performs and controls a communication with the outside at an application layer protocol level. It should be noted that gateway device 200 is disposed inside the firewall.

In the information processing system 1 according to the present embodiment, a computer connected to Internet 5 located outside the firewall, which is cloud server 400 here, is allowed to control any one of MFPs 100, 100A, and 100B, which are connected to LAN 3 located inside the firewall. MFPs 100, 100A, and 100B are control target devices subjected to be controlled by cloud server 400. In some cases, cloud server 400 is accessed from a personal computer (hereinafter, referred to as "PC") connected to LAN 3 inside the firewall and executes a process for providing a service in accordance with an instruction from the user who operates the PC. In other cases, cloud server 400 is accessed from a PC connected to Internet 5 outside the firewall and executes a process for providing a service in accordance with an instruction from the user who operates the PC. It is here assumed, by way of example, that cloud server 400 executes a process based on a service provided thereby and causes MFP 100 to execute a process on the resultant data. In this case, cloud server 400 transmits to MFP 100 a control command for causing MFP 100 to execute the process.

In order to allow a control command, transmitted from cloud server 400 to MFP 100, to pass through the firewall in gateway device 200, gateway device 200 establishes a tunnel connection between cloud server 400 and MFP 100. While there are a variety of techniques and methods for establishing a tunnel connection, it is here assumed that management server 300 supports the tunnel connection.

Gateway device 200 uses a network address of management server 300, which has been stored in advance, to request an establishment of a communication session between gateway device 200 and management server 300. As gateway device 200 is located inside the firewall and management server 300 is located outside the firewall, a communication session passing through the firewall is established. This communication session will be hereinafter referred to as an "always-on session".

When the always-on session is established between gateway device 200 and management server 300, gateway device 200 transmits device identification information for identifying each of MFPs 100, 100A, and 100B connected to LAN 3, to management server 300, via the always-on session. This allows management server 300 to recognize MFPs 100, 100A, and 100B connected to gateway device 200.

Next, a communication session is established between cloud server 400 and management server 300. Here, the communication session established between cloud server 400 and management server 300 will be referred to as a "global session". Management server 300 has received the device identification information of each of MFPs 100, 100A, and 100B from gateway device 200. Thus, management server 300 causes a user who is operating cloud server 400 to select one of MFPs 100, 100A, and 100B as a device with which a tunnel connection can be established. It is here assumed that the user who is operating cloud server 400 selects MFP 100 as the device with which the tunnel connection is to be established.

When the user who is operating cloud server 400 selects MFP 100 as the device with which the tunnel connection is to be established, cloud server 400 transmits a connection request including address information of MFP 100, address information of cloud server 400 and control information, to management server 300. MFP 100 selected by the user who is operating cloud server 400 as the device with which the tunnel connection is to be established becomes a target to be controlled by could server 400.

The address information of MFP 100 includes device identification information of gateway device 200 and device identification information of MFP 100. The address information of cloud server 400 is a uniform resource locator (URL) used by MFP 100 to access cloud server 400. In a URL, for example as in "https://www.example.com/print_service?job_id=j00123:60001", an address (domain name) of cloud server 400, a Web page identifier, an identifier (job ID) of the job executed by cloud server 400, and a listening port number are included. As the listening port, an unused one of the ports within a prescribed range is used. Further, a unique ID is issued as the job ID. The job executed by cloud server 400 is a job which corresponds to a service that the user who is operating cloud server 400 has designated from among the services provided by cloud server 400. Since the URL as the address information of cloud server 400 includes the job ID, it is possible to associate the device that has accessed the URL with the job that is specified by the job ID. In other words, it is possible to associate the job that corresponds to a process providing the service designated by the user who is operating cloud server 400, with the control target device, which is MFP 100 here. The control information indicates contents of a process that the job specified by the job ID causes MFP 100 to execute.

When management server 300 receives a connection request from cloud server 400, management server 300 specifies gateway device 200, on the basis of the device identification information of gateway device 200 included in the address information of MFP 100 included in the connection request, and transfers the connection request to gateway device 200, via the always-on session. In this case, the connection request is encapsulated, for transmission, in accordance with the protocol corresponding to the always-on session.

Further, when gateway device 200 receives the connection request from management server 300, gateway device 200 establishes a communication session with cloud server 400, on the basis of the address information of cloud server 400 included in the connection request. Here, the communication session established between gateway device 200 and cloud server 400 will be referred to as a "first communication session". This completes the tunnel connection passing through the firewall.

When gateway device 200 receives the connection request from management server 300, gateway device 200 specifies MFP 100, on the basis of the device identification information of MFP 100 included in the address information of MFP 100 included in the connection request, and establishes a communication session with MFP 100. Here, the communication session established between gateway device 200 and MFP 100 will be referred to as a "second communication session".

Gateway device 200 connects the first communication session, established between gateway device 200 and cloud server 400, and the second communication session, established between gateway device 200 and MFP 100, to thereby relay a communication between cloud server 400 and MFP 100.

It should be noted that the tunnel connection method is not limited to the above-described method; another method may be used as well. For example, management server 300 may relay a communication between cloud server 400 and MFP 100, as with gateway device 200. For example, gateway device 200 may establish always-on sessions with management server 300 for the respective MFPs 100, 100A, and 100B, and management server 300 may connect the global session, established between management server 300 and cloud server 400, with the always-on session corresponding to MFP 100 that has been designated by the user of cloud server 400, to thereby relay a communication between cloud server 400 and MFP 100. In this case, cloud server 400 only needs to transmit the address information of MFP 100; it does not have to transmit the address information of cloud server 400. The load on management server 300, however, increases because it executes the relay process.

The services provided by cloud server 400 include, for example, a program management service in which cloud server 400 performs version management and version upgrade of a program of MFP 100, a service in which cloud server 400 functions as a file server, and a service in which cloud server 400 performs image processing on image data. The image processing is not particularly restricted, but it may be a process of sharpening or smoothing photo image data, a process of performing character recognition on character image data, or a process of translating a language to another language.

Management server 300 and cloud server 400 are typical computers having well-known hardware configurations and functions, and therefore, a description thereof will not be provided here. MFPs 100, 100A, and 100B have common hardware configurations and functions, and therefore, unless otherwise specified, MFP 100 will be described representatively.

Figure 2:
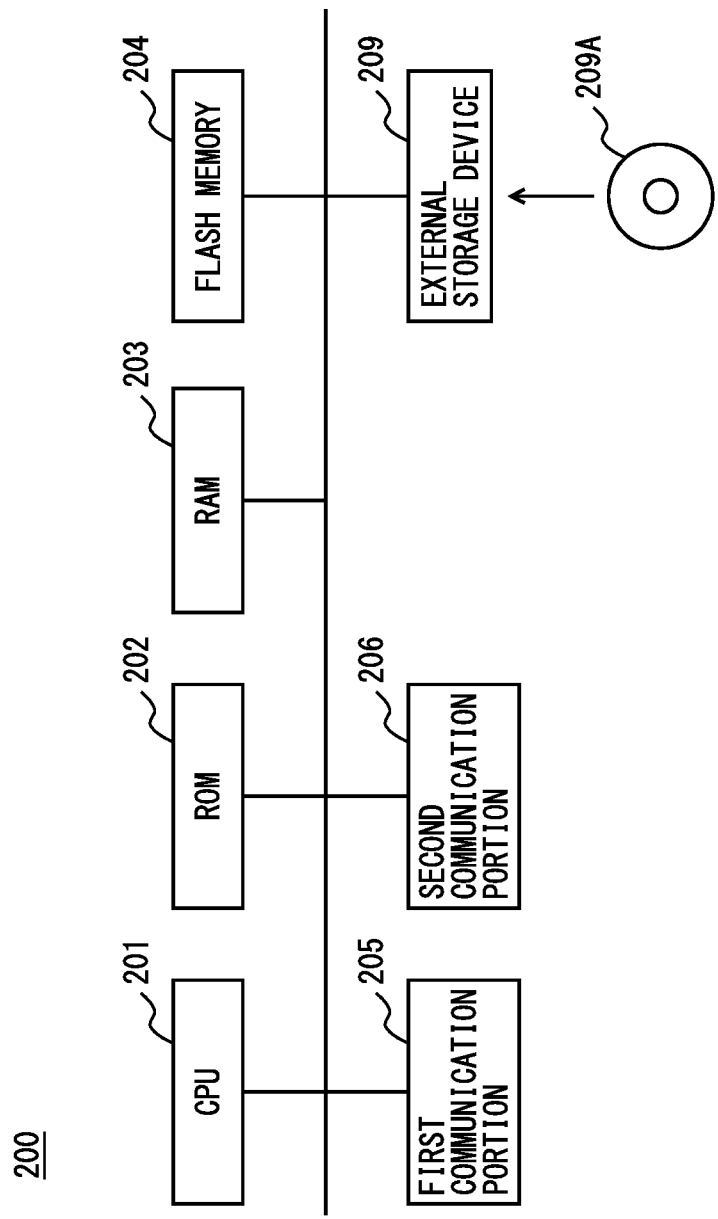
FIG. 2 is a block diagram schematically showing an exemplary hardware configuration of a gateway device.

FIG. 2 is a block diagram schematically showing an exemplary hardware configuration of a gateway device. Referring to FIG. 2, gateway device 200 according to the present embodiment includes: a central processing unit (CPU) 201 which is responsible for overall control of gateway device 200; a read only memory (ROM) 202 for storing, among others, a program to be executed by CPU 201; a random access memory (RAM) 203 used as a work area for CPU 201; a flash memory 204 which stores data in a non-volatile manner; a first communication portion 205; a second communication portion 206; and an external storage device 209.

First communication portion 205 is a communication interface (I/F) for connecting gateway device 200 to Internet 5. Second communication portion 206 is a communication interface (I/F) for connecting gateway device 200 to LAN 3.

Flash memory 204 stores a program executed by CPU 201 or data necessary for execution of the program. CPU 201 loads the program stored in flash memory 204, into RAM 203 for execution. External storage device 209 is detachably attached to gateway device 200, and it can be mounted with a compact disc CD-ROM 209A in which a program is stored. CPU 201 is capable of accessing CD-ROM 209A via external storage device 209. CPU 201 can load a relay program, which is stored in CD-ROM 209A mounted on external storage device 209, into RAM 203 for execution.

While the program stored in flash memory 204 or CD-ROM 209A has been described as the program executed by CPU 201, another computer connected to Internet 5 may rewrite the program stored in flash memory 204, or may additionally write a new program therein. Further, gateway device 200 may download a program from another computer connected to Internet 5. As used herein, the "program" includes, not only the program which CPU 201 can execute directly, but also a source program, a compressed program, an encrypted program, and others.

It is noted that the medium for storing the program executed by CPU 201 is not restricted to CD-ROM 209A. It may be an optical disc (a magneto-optical (MO) disc, a mini disc (MD), or a digital versatile disc (DVD)), an IC card, an optical card, or a semiconductor memory such as a mask ROM, an erasable programmable ROM (EPROM), an electrically erasable and programmable ROM (EEPROM), or the like.

Figure 3:
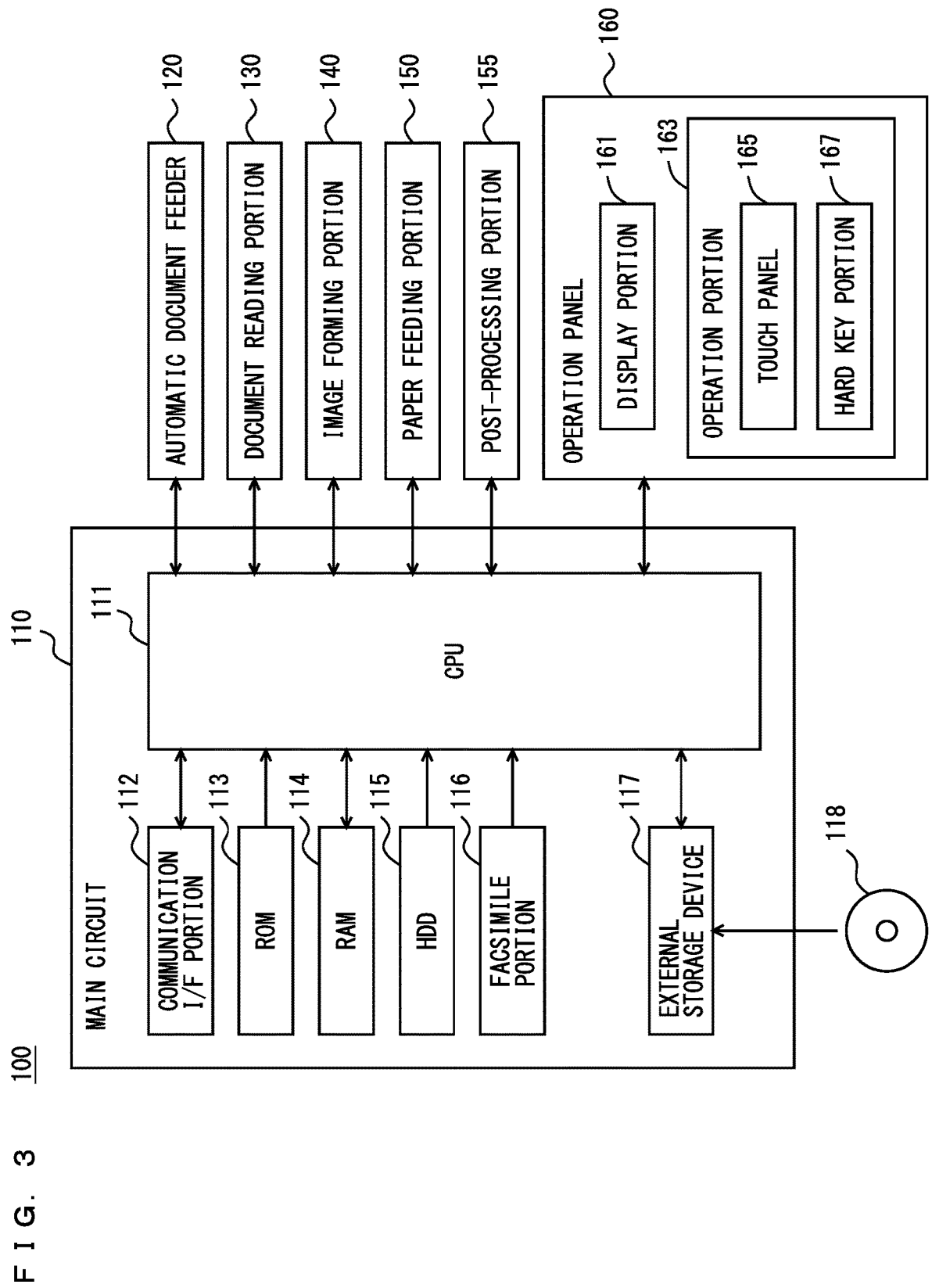
FIG. 3 is a block diagram schematically showing an exemplary hardware configuration of an MFP.

FIG. 3 is a block diagram schematically showing an exemplary hardware configuration of the MFP. Referring to FIG. 3, MFP 100 includes: a main circuit 110; a document reading portion 130 which reads a document; an automatic document feeder 120 which feeds a document to document reading portion 130; an image forming portion 140 which forms an image on a sheet of paper or the like on the basis of image data output from document reading portion 130 that has read a document; a paper feeding portion 150 which supplies sheets of paper to image forming portion 140; a post-processing portion 155 which processes sheets of paper on which images have been formed; and an operation panel 160 serving as a user interface.

Post-processing portion 155 performs a sorting process of sorting and discharging one or more sheets of paper on which images have been formed by image forming portion 140, a hole-punching process of punching the sheets, and a stapling process of stapling the sheets.

Main circuit 110 includes a CPU 111, a communication interface (I/F) portion 112, a ROM 113, a RAM 114, a hard disk drive (HDD) 115 as a mass storage, a facsimile portion 116, and an external storage device 117 on which a CD-ROM 118 is mounted. CPU 111 is connected with automatic document feeder 120, document reading portion 130, image forming portion 140, paper feeding portion 150, post-processing portion 155, and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from document reading portion 130.

Operation panel 160, which is provided on an upper surface of MFP 100, includes a display portion 161 and an operation portion 163. Display portion 161 is a display such as a liquid crystal display (LCD) or an organic electroluminescence display (ELD), and displays an instruction menu for the user, information about acquired image data, and others. Operation portion 163 includes a hard key portion 167 having a plurality of keys, and accepts input data, such as instructions, characters, and numerical characters, according to the key operations by the user. Operation portion 163 further includes a touch panel 165 disposed on display portion 161.

Communication I/F portion 112 is an interface for connecting MFP 100 to LAN 3. CPU 111 communicates with a device which is connected to LAN 3, via communication I/F portion 112 for data transmission/reception. Further, communication I/F portion 112 is able to communicate with a computer connected to the Internet, such as cloud server 400, via gateway device 200.

Facsimile portion 116 is connected to public switched telephone networks (PSTN), and transmits facsimile data to or receives facsimile data from the PSTN. Facsimile portion 116 stores the received facsimile data into HDD 115, or outputs the data to image forming portion 140. Image forming portion 140 prints on a sheet of paper the facsimile data received by facsimile portion 116. Further, facsimile portion 116 converts the data stored in HDD 115 to facsimile data, and transmits the facsimile data to a facsimile machine connected to the PSTN.

External storage device 117 is mounted with CD-ROM (compact Disk ROM) 118. CPU 111 is capable of accessing CD-ROM 118 via external storage device 117. CPU 111 loads the program stored in CD-ROM 118 which is mounted on external storage device 117, into RAM 114 for execution. It is noted that the medium for storing the program executed by CPU 111 is not restricted to CD-ROM 118. It may be an optical disc (an MO disc, an MD, or a DVD), an IC card, an optical card, or a semiconductor memory such as a mask ROM, an EPROM, an EEPROM, or the like.

Further, CPU 111 may load a program stored in HDD 115, into RAM 114 for execution. In this case, another computer connected to LAN 3 or Internet 5 may rewrite the program stored in HDD 115 of MFP 100, or may additionally write a new program therein. Further, MFP 100 may download a program from another computer connected to LAN 3 or Internet 5, and store the program in HDD 115. As used herein, the "program" includes, not only the program which CPU 111 can execute directly, but also a source program, a compressed program, an encrypted program, and others.

Figure 4:
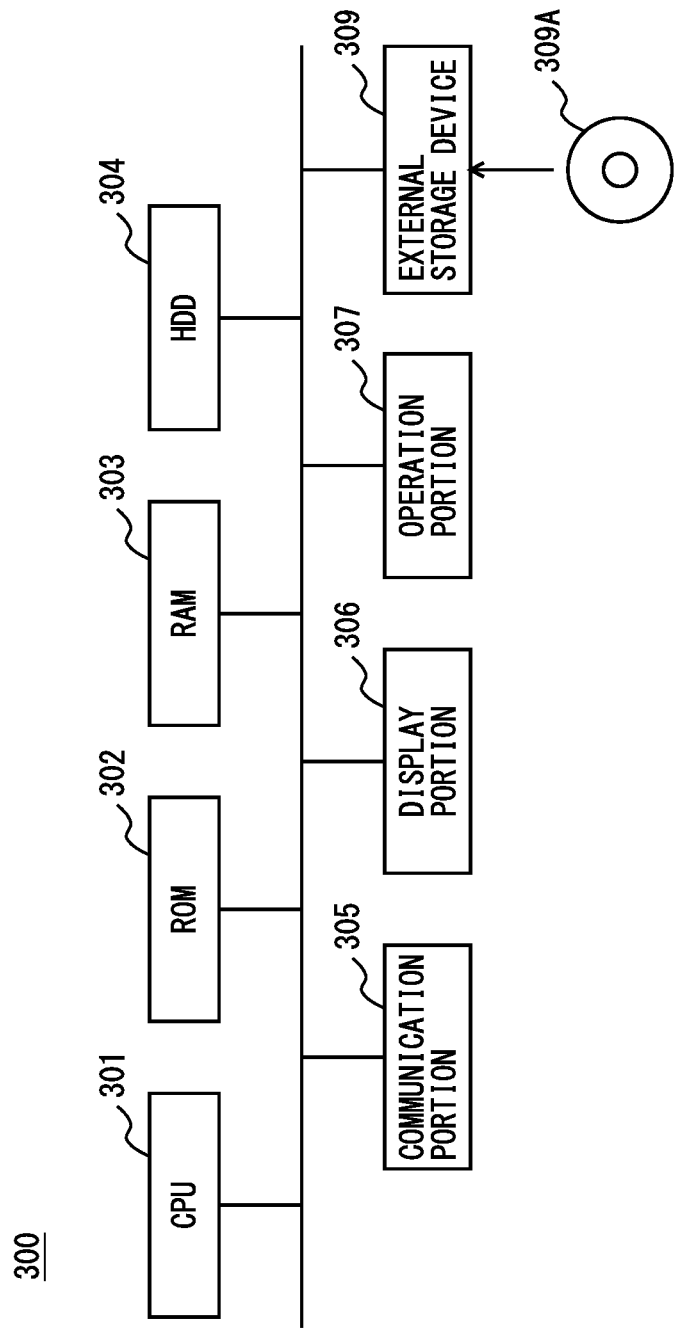
FIG. 4 is a block diagram schematically showing an exemplary hardware configuration of a management server according to the present embodiment.

FIG. 4 is a block diagram schematically showing an exemplary hardware configuration of a management server according to the present embodiment. Referring to FIG. 4, management server 300 includes: a CPU 301 which is responsible for overall control of management server 300; a ROM 302 for storing, among others, a program to be executed by CPU 301; a RAM 303 used as a work area for CPU 301; a HDD 304 which stores data in a non-volatile manner; a communication portion 305 which connects CPU 301 to Internet 5; a display portion 306 which displays information; an operation portion 307 which accepts operations by a user; and an external storage device 309.

External storage device 309 is mounted with a CD-ROM 309A. CPU 301 is capable of accessing CD-ROM 309A via external storage device 309. CPU 301 loads a program stored in CD-ROM 309A which is mounted on external storage device 309, into RAM 303 for execution. It is noted that the medium for storing the program executed by CPU 301 is not restricted to CD-ROM 309A. It may be an optical disc, an IC card, an optical card, or a semiconductor memory such as a mask ROM, an EPROM, an EEPROM, or the like.

Further, the program executed by CPU 301 is not restricted to the program stored in CD-ROM 309A; a program stored in HDD 304 may be loaded into RAM 303 for execution. In this case, another computer connected to Internet 5 may rewrite the program stored in HDD 304 of management server 300, or may additionally write a new program therein. Further, management server 300 may download a program from another computer connected to Internet 5, and store the program in HDD 304. As used herein, the "program" includes, not only the program which CPU 301 can execute directly, but also a source program, a compressed program, an encrypted program, and others.

Figure 5:
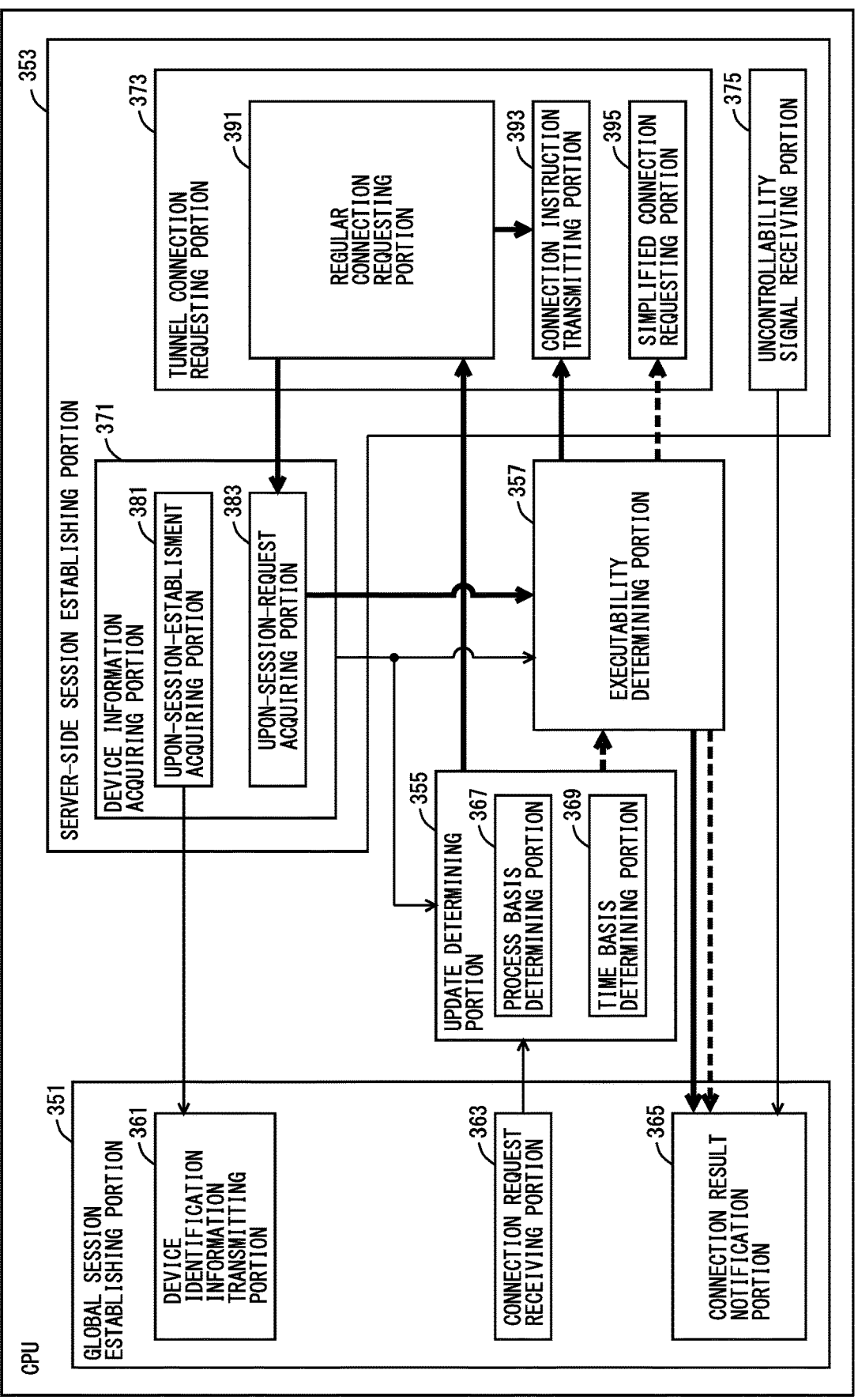
FIG. 5 is a block diagram showing, by way of example, the functions of a CPU included in the management server.

FIG. 5 is a block diagram showing, by way of example, the functions of a CPU included in the management server. The functions shown in FIG. 5 are formed in CPU 301 included in management server 300 as CPU 301 executes a connection support program stored in ROM 302, HDD 304, or CD-ROM 309A. Referring to FIG. 5, CPU 301 included in management server 300 includes a global session establishing portion 351, a server-side session establishing portion 353, an update determining portion 355 and an executability determining portion 357.

Server-side session establishing portion 353 controls communication portion 305 to establish a communication session with gateway device 200. The communication session established here is the always-on session. Server-side session establishing portion 353 establishes the communication session in response to reception of a communication session establishment request from gateway device 200. Server-side session establishing portion 353 includes a device information acquiring portion 371, a tunnel connection requesting portion 373, and an uncontrollability signal receiving portion 375.

Device information acquiring portion 371 receives device information from gateway device 200, via the always-on session established between management server 300 and gateway device 200. While the functions of gateway device 200 will be described in detail later, briefly, gateway device 200 acquires device information of any device connected to LAN 3, i.e. the device information of each of MFPs 100, 100A, and 100B here, and transmits the acquired device information to management server 300 via the always-on session. The device information of each of MFPs 100, 100A, and 100B includes device identification information for identifying each of MFPs 100, 100A, and 100B, and status information indicating each of statuses of MFPs 100, 100A, and 100B. The device identification information may be, but not limited to, a local Internet protocol (IP) address assigned to the corresponding one of MFPs 100, 100A, and 100B in LAN 3. The status information includes, for each of MFPs 100, 100A, and 100B, ability information for specifying an executable process, a setting value of a parameter used for executing a process, job execution information regarding a job in progress, an operation status indicating existence/non-existence of a current operation, an occurrence status of an error, configuration of an optional equipment, version information of a firmware program, version information of an application program, free space remaining in HDD 115, a counter value of printed copies, the number of queued jobs and the like.

Device information acquiring portion 371 includes an upon-session-establishment acquiring portion 381 and an upon-session-request acquiring portion 383. Upon-session-establishment acquiring portion 381, immediately after the always-on session is established between gateway device 200 and management server 300, receives device information transmitted by gateway device 200, and outputs to global session establishing portion 351 the received device information and device identification information of gateway device 200. The device identification information of gateway device 200 may be, but not limited to, a global IP address assigned to gateway device 200 in Internet 5. Upon-session-request acquiring portion 383 will be described in detail later.

Global session establishing portion 351 controls communication portion 305 to establish a communication session with a computer located outside the firewall. Here, it is assumed that a communication session is established between management server 300 and cloud server 400. The communication session established here is the global session. Global session establishing portion 351 controls communication portion 305, and establishes the global session with cloud server 400 in response to reception of a communication session establishment request from cloud server 400. Global session establishing portion 351 includes a device identification information transmitting portion 361, a connection request receiving portion 363, and a connection result notification portion 365.

Device identification information transmitting portion 361 receives device identification information of gateway device 200 and device identification information of each of MFPs 100, 100A, and 100B from upon-session-establishment acquiring portion 381. Device identification information transmitting portion 361 transmits the device identification information of gateway device 200 and the device identification information of each of MFPs 100, 100A, and 100B to cloud server 400 via the global session. For example, device identification information transmitting portion 361 transmits, to cloud server 400, a device selecting screen which includes the device identification information of gateway device 200 and the device identification information of each of MFPs 100, 100A, and 100B and on which gateway device 200 and one of MFPs 100, 100A, and 100B can be selected. Here, it is assumed that the device selecting screen is transmitted to cloud server 400 and then, in cloud server 400, a user who is operating cloud server 400 selects the device identification information of gateway device 200 and the device identification information of MFP 100. In this case, cloud server 400 transmits a connection request to management server 300 via the global session. A command to transmit a connection request may be embedded in the device selecting screen. For example, in the case where the device selecting screen is described in a markup language such as hypertext markup language (HTML) or extensible markup language (XML), the command to transmit a connection request may be embedded in the device selecting screen using a programming language such as Java (registered trademark) or JavaScript (registered trademark). This configuration makes it possible to cause cloud server 400 to perform a process of transmitting a connection request when the device identification information of MFP 100 is designated on the device selecting screen being displayed in cloud server 400.

The connection request includes address information of MFP 100, address information of cloud server 400, and control information. The address information of MFP 100 includes device identification information of gateway device 200 and device identification information of MFP 100. The address information of cloud server 400 is a URL used by MFP 100 to access cloud server 400. The URL includes an address (domain name) of cloud server 400, a Web page identifier, an identifier (job ID) of the job executed by cloud server 400, and a listening port number. The control information indicates contents of a process that the job specified by the job ID causes MFP 100 as a control target device to execute.

Connection request receiving portion 363 receives a connection request that cloud server 400 transmits via the global session, and outputs the received connection request to update determining portion 355. Update determining portion 355 receives device information of each of MFPs 100, 100A, and 100B from device information acquiring portion 371, and a connection request from connection request receiving portion 363. Update determining portion 355, in response to reception of the connection request, determines whether to update the device information of a control target device specified by the connection request, i.e. MFP 100 here. When update determining portion 355 determines to update the device information, update determining portion 355 outputs a regular connection instruction to tunnel connection requesting portion 373. The regular connection instruction includes a connection request input from connection request receiving portion 363. When update determining portion 355 determines not to update the device information, update determining portion 355 outputs a determination instruction to executability determining portion 357. The determination instruction includes a connection request input from connection request receiving portion 363.

It is noted that in the figure, a flow of information in the case where update determining portion 355 determines to update is shown by dotted arrows, and a flow of information in the case where update determining portion 355 determines not to update is shown by bold arrows.

Update determining portion 355 includes a process basis determining portion 367 and a time basis determining portion 369. Process basis determining portion 367 determines whether to update the device information of the control target device on the basis of control information included in a connection request. Process basis determining portion 367 determines to update the device information of MFP 100 in the case where the control information indicates contents to cause MFP 100 as the control target device to execute a process of a first kind. The process of a first kind includes, for example, a process of causing MFP 100 to form an image and outputting a prescribed parameter set in MFP 100. There may be a case where when MFP 100 executes a process of forming an image waiting time occurs if MFP 100 executes a process of forming one or more images after that the device information has been acquired. Further, there may be a case where when MFP 100 executes a process of outputting a prescribed parameter the parameter is changed after that the device information has been acquired.

Further, process basis determining portion 367 determines not to update the device information in the case where the control information indicates contents to cause MFP 100 as the control target device to execute a process of a second kind. The process of a second kind includes a process of setting a parameter for MFP 100 as the control target device to execute a process. In the case where MFP 100 executes the process of setting a parameter for execution of a process, the parameter is set after the execution of a process, so that a result of the execution of a process is not influenced along of a parameter set before the execution of a process.

Time basis determining portion 369 determines not to update the device information in the case where the time that elapses after the device information of MFP 100 as the control target has been acquired as final is within a prescribed time, and time basis determining portion 369 determines to update the device information in the case where the elapsed time is beyond the prescribed time. This is because the device information may be changed when the elapsed time is beyond the prescribed time.

<When the Control Information is Not Updated>

When update determining portion 355 determines not to update the control information, update determining portion 355 outputs a determination instruction to executability determining portion 357. The determination instruction includes a connection request input from connection request receiving portion 363.

Executability determining portion 357 receives the determination instruction from update determining portion 355, and the device information of each of MFPs 100, 100A, and 100B from device information acquiring portion 371. There may be a case where executability determining portion 357 receives the device information of each of MFPs 100, 100A, and 100B from device information acquiring portion 371 a plurality of times before the determination instruction is received from update determining portion 355. In this case, the device information which is received as final is subject to be a process target. For example, at a stage before the device information of MFP 100 is acquired by upon-session-request acquiring portion 383, the device information acquired by upon-session-establishment acquiring portion 381 is subject to be a process target, whereas at a stage after the device information of MFP 100 is acquired by upon-session-request acquiring portion 383, the device information acquired as final by upon-session-request acquiring portion 383 is subject to be a process target.

Executability determining portion 357 determines whether MFP 100 is able to execute a process specified by the control information included in the connection request, on the basis of the device information of MFP 100 as the control target device specified by the connection request included in the determination instruction. For example, in the case where the process specified by the control information is a process of executing a job, if MFP 100 is not executing another job, executability determining portion 357 determines the process as executable, and if MFP 100 is executing another job, executability determining portion 357 determines the process specified by the control information as executable on the condition that the process is executable with another job in parallel. Therefore, in the case where MFP 100 is not able to execute the process specified by the control information with another job in parallel, executability determining portion 357 determines the process specified by the control information as non-executable.

Further, in the case where the process specified by the control information is a process of storing data in HDD 115, executability determining portion 357 determines the process of storing the data as executable on the condition that free space remaining in HDD 115 remains enough to store the data, and if the free space does not remain enough, executability determining portion 357 determines the process of storing the data as non-executable. Further, if MFP 100 is in trouble due to breakdown, executability determining portion 357 determines the process of storing the data as non-executable. Furthermore, in the case where the process specified by the control information is a process of outputting a status of MFP 100, if MFP 100 is not executing another job, executability determining portion 357 determines the process as executable, and if MFP 100 is executing another job, executability determining portion 357 determines the process as non-executable.

When executability determining portion 357 determines that MFP 100 is able to execute the process specified by the control information included in the connection request, executability determining portion 357 outputs a simplified connection instruction to tunnel connection requesting portion 373. The simplified connection instruction includes a connection request.

Tunnel connection requesting portion 373 includes a simplified connection requesting portion 395. When a simplified connection instruction is input from executability determining portion 357, simplified connection requesting portion 395 transmits a simplified connection request to gateway device 200 specified by the connection request via the always-on session. The simplified connection request includes device identification information of a control target device specified by the connection request included in the simplified connection instruction, i.e. MFP 100 here. The simplified connection request is transmitted as a packet which has been encapsulated so as to conform to the protocol determined by the always-on session.

When executability determining portion determines that MFP 100 is unable to execute the process specified by the control information included in the connection request, executability determining portion 357 outputs a non-executability signal to connection result notification portion 365.

Upon receipt of the simplified connection request, gateway device 200 establishes a communication session with MFP 100. When gateway 200 fails to establish a communication session with MFP 100, gateway 200 returns an uncontrollability signal indicating that MFP 100 is uncontrollable. A case where gateway device 200 fails to establish a communication session with MFP 100, for example, may be a case where MFP 100 has not been turned on or MFP 100 is unable to communicate because it is in trouble.

Uncontrollability signal receiving portion 375 receives via the always-on session an uncontrollability signal transmitted by gateway device 200. Uncontrollability signal receiving portion 375 outputs the uncontrollability signal to connection result notification portion 365 of global session establishing portion 351.

When a non-executability signal is input from executability determining portion 357 or an uncontrollability signal is input from uncontrollability signal receiving portion 375, connection result notification portion 365 transmits to cloud server 400 via the global session the uncontrollability signal indicating that MFP 100 as the control target device is uncontrollable. Connection result notification portion 365 displays in cloud server 400 a message indicating that MFP as the control target device is uncontrollable, and thereby connection result notification portion 365 is able to notify a user of cloud server 400 that MFP 100 is uncontrollable.

<When the Control Information is Updated>

When update determining portion 355 determines to update the device information, update determining portion 355 outputs a regular connection instruction to tunnel connection requesting portion 373. The regular connection instruction includes a connection request input from connection request receiving portion 363.

Tunnel connection requesting portion 373 includes a regular connection requesting portion 391 and a connection instruction transmitting portion 393. In response to input of a regular connection instruction from update determining portion 355, regular connection requesting portion 391 transmits via the always-on session a regular connection request to gateway device 200 specified by a connection request included in the regular connection instruction, and outputs to upon-session-request acquiring portion 383 and connection instruction transmitting portion 393 a pair of the connection request and a signal indicating that the regular connection request has been transmitted. The regular connection request includes the device identification information of a control target device specified by the connection request included in the regular connection instruction, i.e. MFP 100 here. The regular connection request is transmitted as a packet which has been encapsulated so as to conform to the protocol determined by the always-on session. While the functions of gateway device 200 which receives the regular connection request will be described in detail later, briefly, gateway device 200 establishes a communication session with MFP 100, acquires the device information of MFP 100, and returns the acquired device information of MFP 100.

After the pair of the connection request and a signal indicating that the regular connection request has been transmitted is input from regular connection request portion 391, upon-session-request acquiring portion 383 of device information acquiring portion 371 receives via the always-on session the device information of MFP 100 transmitted by gateway device 200, and outputs to executability determining portion 357 a pair of the received device information of MFP 100 and the connection request.

When the pair of the device information of MFP 100 and the connection request is input from upon-session-request acquiring portion 383, executability determining portion 357 determines, on the basis of the device information of MFP 100, the executability of a process specified by control information specified by the connection request. The determination of the executability has been described above, and thus a detailed description thereof will not be repeated here.

When executability determining portion 357 determines that MFP 100 is able to execute a process specified by the control information included in the connection request, executability determining portion 357 outputs a transmission instruction to connection instruction transmitting portion 393.

When a signal indicating that the regular connection request has been transmitted is input from regular connection requesting portion 391, connection instruction transmitting portion 393 transmits, in response to input of a transmission instruction from executability determining portion 357, a connection instruction to gateway device 200 via the always-on session. The connection instruction includes the device identification information of MFP 100.

When executability determining portion 357 determines that MFP 100 is unable to execute a process specified by the control information included in the connection request, executability determining portion 357 outputs a non-executability signal to connection result notification portion 365.

Gateway device 200 which receives the regular connection request establishes a communication session with MFP 100. When gateway device 200 fails to establish a communication session with MFP 100, gateway device 200 returns an uncontrollability signal indicating that MFP 100 is uncontrollable.

The functions of uncontrollability signal receiving portion 375 and connection result notification portion 365 are the same as the functions described in <When the control information is updated>, and thus a detailed description thereof will not be repeated here.

Figure 6:
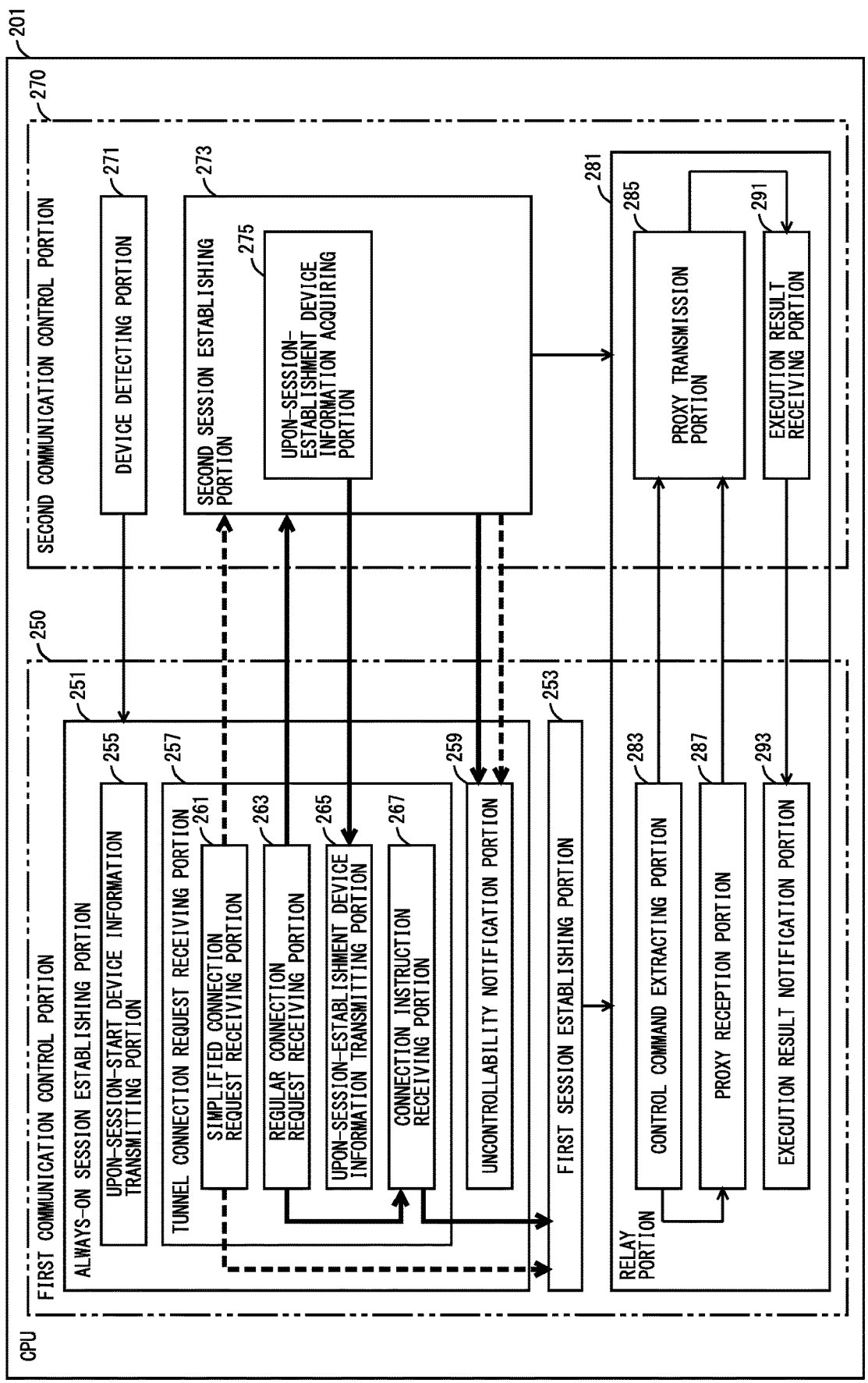
FIG. 6 is a block diagram showing, by way of example, the functions of a CPU included in the gateway device.

FIG. 6 is a block diagram showing, by way of example, the functions of a CPU included in the gateway device. The functions shown in FIG. 6 are formed in CPU 201 included in gateway device 200 as CPU 201 executes a relay program stored in ROM 202, flash memory 204, or CD-ROM 209A. Referring to FIG. 6, CPU 201 included in gateway device 200 includes: an always-on session establishing portion 251, a first session establishing portion 153, a device detecting portion 271, a second session establishing portion 273, and a relay portion 281.

Relay portion 281 includes: a control command extracting portion 283, a proxy transmission portion 285, a proxy reception portion 287, an execution result receiving portion 291, and an execution result notification portion 293.

CPU 201 further includes a first communication control portion 250 and a second communication control portion 260. First communication control portion 250 controls first communication portion 205 so as to control a communication with a computer connected to Internet 5. First communication control portion 250 includes always-on session establishing portion 251, first session establishing portion 253, and also includes control command extracting portion 283, proxy reception portion 287, and execution result notification portion 293 included in relay portion 281.

Second communication control portion 260 controls second communication portion 206 so as to control a communication with each of MFPs 100, 100A, and 100B connected to LAN 3. Second communication control portion 260 includes device detecting portion 271, second session establishing portion 273, and also includes proxy transmission portion 285, and execution result receiving portion 291 included in relay portion 281.

Device detecting portion 271 acquires device information of any device that is connected to LAN 3 located inside the firewall. Device detecting portion 271 searches for any device connected to LAN 3, at a prescribed timing, and acquires device information of the detected device. The prescribed timing may be determined arbitrarily; it may be, for example, the time when gateway device 200 has been turned on, or a predetermined time. Here, it is assumed that MFPs 100, 100A, and 100B are detected as the devices connected to LAN 3. Device detecting portion 271 controls second communication portion 206 to acquire device information of each of MFPs 100, 100A, and 100B detected as the devices connected to LAN 3. The device information includes device identification information for identifying each of MFPs 100, 100A, and 100B and status information indicating each of statuses of MFPs 100, 100A, and 100B. The device identification information is a local IP address, for example. Device detecting portion 271 outputs the acquired device information to always-on session establishing portion 251.

Always-on session establishing portion 251 receives the device identification information of each of MFPs 100, 100A, and 100B from device detecting portion 271. Always-on session establishing portion 251 controls first communication portion 205 to transmit a communication session establishment request to management server 300, and establishes a communication session with management server 300. The communication session established here is the always-on session which is connected constantly. The always-on session is not particularly limited, but it may be, for example, a message session based on extensible messaging and presence protocol (XMPP). The global IP address of management server 300 has been stored in advance in flash memory 204. Always-on session establishing portion 251 uses the global IP address stored in flash memory 204 to transmit the communication session establishment request to management server 300, and performs prescribed negotiations with management server 300 to thereby establish the always-on session.

Always-on session establishing portion 251 includes an upon-session-start device identification information transmitting portion 255, a tunnel connection request receiving portion 257, and an uncontrollability notification portion 259. Upon-session-start device identification information transmitting portion 255 transmits the device information of each of MFPs 100, 100A, and 100B, input from device detecting portion 271, to management server 300 via the always-on session, so as to notify management server 300 of the devices connected to LAN 3 located inside the firewall.

Tunnel connection request receiving portion 27 controls first communication portion 205 to receive a tunnel connection request from management server 300 via the always-on session. The tunnel connection request includes the connection request that management server 300 has received from cloud server 400. The connection request includes the address information of MFP 100 and the address information of cloud server 400. The address information of MFP 100 includes the device identification information of gateway device 200 and the device identification information of MFP 100. The address information of cloud server 400 is a URL used by MFP 100 to access cloud server 400.

The tunnel connection request includes a regular connection request and a simplified connection request. Each of the regular connection request and the simplified connection request includes the address information of MFP 100 and the address information of cloud server 400. Tunnel connection request receiving portion 257 includes a simplified connection request receiving portion 261, a regular connection request receiving portion 263, an upon-session-establishment device information transmitting portion 265, and a connection instruction receiving portion 267. It is noted that in the figure, a flow of information in the case where tunnel connection request receiving portion 257 receives the simplified connection request is shown by dotted arrows, and a flow of information in the case where tunnel connection request receiving portion 257 receives the regular connection request is shown by the bold arrows.

Simplified connection request receiving portion 261 receives a simplified connection request transmitted from management server 300. In response to reception of the simplified connection request from management server 300, simplified connection request receiving portion 261 outputs the address information of MFP 100, included in the simplified connection request, to first session establishing portion 253, outputs the address information of cloud server 400, included in the simplified connection request, to first session establishing portion 253, and outputs the address information of MFP 100, included in the simplified connection request, to second session establishing portion 273.

First session establishing portion 253 is operable, when the address information of cloud server 400 is input from simplified connection request receiving portion 261, to control first communication portion 205 to establish a communication session with cloud server 400. The communication session established here is the first communication session. First session establishing portion 253 outputs session identification information for identifying the first communication session, to relay portion 281.

Second session establishing portion 273 is operable, when the address information of MFP 100 is input from simplified connection request receiving portion 261, to control second communication portion 206 to transmit a communication session establishment request to MFP 100, and establishes a communication session with MFP 100. The communication session established here is the second communication session. The second communication session is not particularly limited; it only needs to be a communication session conforming to the communication protocol that is used in LAN 3. When second session establishing portion 273 succeeds establishment of the second session, second session establishing portion 273 outputs session identification information for identifying the second communication session, to relay portion 281.

Regular connection request receiving portion 263 receives a regular connection request transmitted from management server 300. In response to reception of the regular connection request, regular connection request receiving portion 263 outputs the address information of MFP 100, included in the regular connection request, to second session establishing portion 273, and outputs a reception instruction including the address information of cloud server 400, included in the regular connection request, to connection instruction receiving portion 267.

Second session establishing portion 273 is operable, when the address information of MFP 100 is input from regular connection request receiving portion 263, to control second communication portion 206 to transmit a communication session establishment request to MFP 100, and establishes a second session with MFP 100. Second session establishing portion 273 outputs session identification information for identifying the second session, to relay portion 281.

Further, second session establishing portion 273 includes an upon-session-establishment device information acquiring portion 275. Upon-session-establishment device information acquiring portion 275 controls second communication portion 206 to acquire device information from MFP 100 using the address information of MFP 100 input from regular connection request receiving portion 263, via first session. Upon-session-establishment device information acquiring portion 275 outputs the device information acquired from MFP 100 to upon-session-establishment device information transmitting portion 265.

Upon-session-establishment device information transmitting portion 265 is operable, when the device information of MFP 100 is input from upon-session-establishment device information acquiring portion 275, to control first communication portion 205 to transmit the device information of MFP 100 to management server 300 via the always-on session.

Connection instruction receiving portion 267 is operable, after a reception instruction is input from regular connection request receiving portion 263, to control first connection portion 205 and receive via the always-on session a connection instruction transmitted from management server 300. In response to reception of the connection instruction, connection instruction receiving portion 267 outputs the address information of cloud server 400, included in the reception instruction, to first session establishing portion 253.

First session establishing portion 253 is operable, in response to input of the address information of cloud server 400 from connection instruction receiving portion 267, to control first communication portion 205 and establish a first session with cloud server 400. First session establishing portion 253 outputs session identification information for identifying the first session, to relay portion 281.

Second session establishing portion 273 is operable, in the case where address information of a control target device, i.e. MFP 100 here, from any one of simplified connection request receiving portion 261 and regular connection request receiving portion 263, to establish a second session. There may be a case where second session establishing portion 273 fails to establish the second session. When second session establishing portion 273 fails to establish the second session, second session establishing portion 273 notifies uncontrollability notification portion 259 that the connection has failed. The second session fails to be established when MFP 100 has not been turned on, or when there has occurred a trouble making MFP 100 unable to communicate.

In response to reception of notification that the communication with the control target device has failed, from second session establishing portion 273, uncontrollability notification portion 259 transmits an uncontrollability signal indicating that the control target device is uncontrollable, to management server 300 via the always-on session.

Relay portion 281 receives session identification information of the first communication session from first session establishing portion 253 and session identification information of the second communication session from second session establishing portion 273. Relay portion 281 uses the first communication session established by first session establishing portion 253 and the second communication session established by second session establishing portion 273 to relay a communication between cloud server 400 and MFP 100. Relaying the communication between cloud server 400 and MFP 100 by relay portion 270 enables data transmission/reception between cloud server 400 and MFP 100. Relay portion 281 associates the first communication session with the second communication session, and transmits data that is received from cloud server 400 via the first communication session, to MFP 100 via the second communication session, and also transmits data that is received from MFP 100 via the second communication session, to cloud server 400 via the first communication session.

Control command extracting portion 283 acquires a packet including a control command, from among the packets received from cloud server 400 via the first communication session. The control command is a command which is destined for MFP 100 from cloud server 400 so as to cause MFP 100 to execute a process. The control command specifies the process to be executed by MFP 100. When acquiring a packet that includes a control command, control command extracting portion 283 outputs the control command to proxy transmission portion 285 and proxy reception portion 287. The process specified by the control command includes a process of executing a job, a process of changing a setting value, and a process of acquiring a status of a device.

When proxy reception portion 287 receives a control command from control command extracting portion 283, if the control command is a command to process data, proxy reception portion 287 acquires the data to be processed, which is received together with the control command via the first communication session. Proxy reception portion 287 outputs the acquired data to proxy transmission portion 285.

Proxy transmission portion 285 transmits the control command received from control command extracting portion 283 to MFP 100, on behalf of cloud server 400, via the second communication session. At this time, proxy transmission portion 285 transmits information indicating that the control command has been transmitted from cloud server 400, by attaching the information to the control command.

In the case where the control command included in the proxy transmission instruction is a command to process data, proxy transmission portion 285 transmits the data input from proxy receiving portion 287 to MFP 100 via the second communication session, together with the control command. When transmitting the control command to MFP 100, proxy transmission portion 285 outputs a signal indicating that it has transmitted the control command to MFP 100, to execution result receiving portion 289.

Execution result receiving portion 291 receives, from proxy transmission portion 285, a signal indicating that it has transmitted the control command to MFP 100, and then receives an execution result from MFP 100 via the second communication session. Execution result receiving portion 291 outputs the received execution result to execution result notification portion 293.

Execution result notification portion 293 is operable, when an execution result is input from execution result receiving portion 291, to transmit the execution result to cloud server 400, on behalf of MFP 10, via the first communication session. The execution result includes the information indicating that the transmission source is MFP 100.

Figure 7:
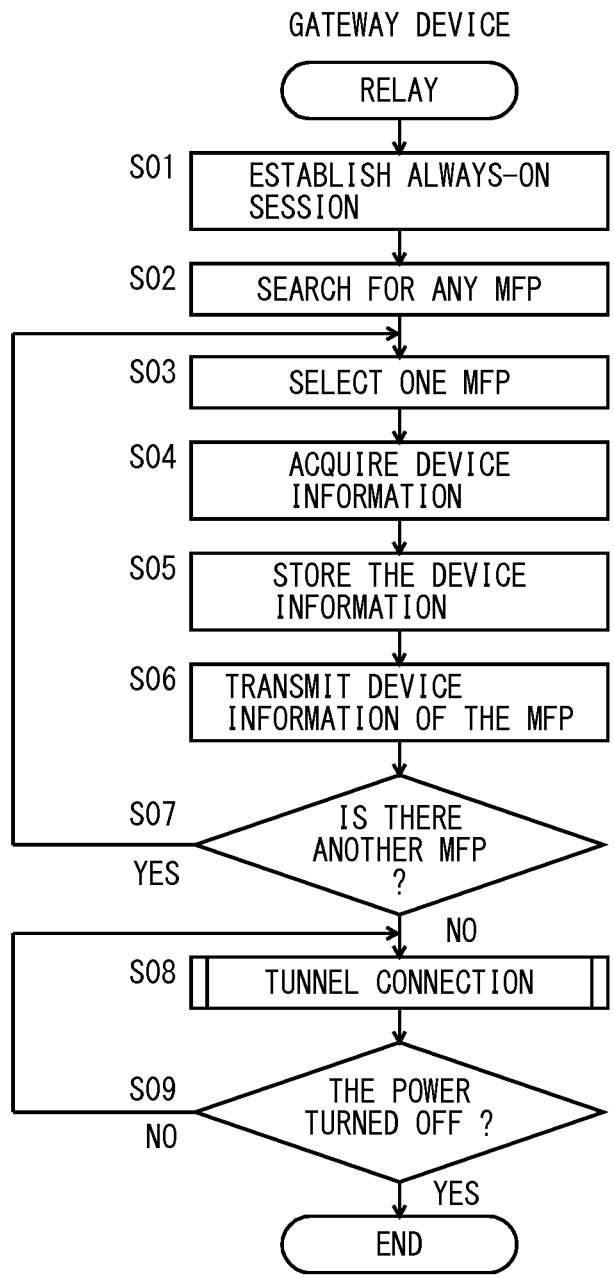
FIG. 7 is a flowchart illustrating an exemplary flow of a relay process.

FIG. 7 is a flowchart illustrating an exemplary flow of a relay process. The relay process is performed by CPU 201 included in gateway device 200 as CPU 201 executes a relay program stored in ROM 202, flash memory 204, or CD-ROM 209A. Referring to FIG. 7, CPU 201 included in gateway device 200 controls first communication portion 205 to establish an always-on session with management server 300 (step S01). Specifically, CPU 201 uses the global IP address of management server 300 stored in flash memory 204 to transmit a communication session establishment request to management server 300, and performs prescribed negotiations with management server 300 to thereby establish the always-on session. The always-on session is not particularly limited, but it may be, for example, a message session based on XMPP.

In the following step S02, CPU 201 searches for any device connected to LAN 3 located inside the firewall. Specifically, CPU 201 broadcasts an inquiry over LAN 3, and acquires device identification information returned from each of MFPs 100, 100A, 100B, and thereby finds MFPs 100, 100A, and 100B. The device identification information may be, but not limited to, a local IP address assigned to each of MFPs 100, 100A, and 100B in LAN 3.

In the following step S03, CPU 201 selects one of MFPs 100, 100A, and 100B detected in step S02, as a process target. It is here assumed that MFP 100 is selected.

In step S04, CPU 201 acquires device information from MFP 100 selected as the process target. The device information is information indicating the statuses of MFP 100, and it includes: information about a job being executed, its operation status, its error occurrence status, configuration of optional equipment, version information of a firmware program, version information of an application program, free space remaining in HDD 115, a counter value of printed copies, the number of queued jobs, and setting values.

In step S05, CPU 201 stores the device information of MFP 100 into flash memory 204, and the process proceeds to step S06. In step S06, CPU 201 transmits device information acquired in step S04 for MFP 100 being selected as the process target, to management server 300, via the always-on session established in step S01. This enables management server 300 to recognize MFP 100 connected to gateway device 200. The process then proceeds to step S07.

In step S07, CPU 201 determines whether there is any device not yet selected as a process target in step S03 among MFPs 100, 100A, and 100B detected in step S02. If there is a device yet to be selected, the process returns to step S03; otherwise, the process proceeds to step S08. In step S08, CPU 201 carries out a tunnel connection process (which will be described in detail below), and the process proceeds to step S09. In step S09, CPU 201 determines whether the power has been turned off. If so, the process is terminated; otherwise, the process returns to step S08.

Figure 8:
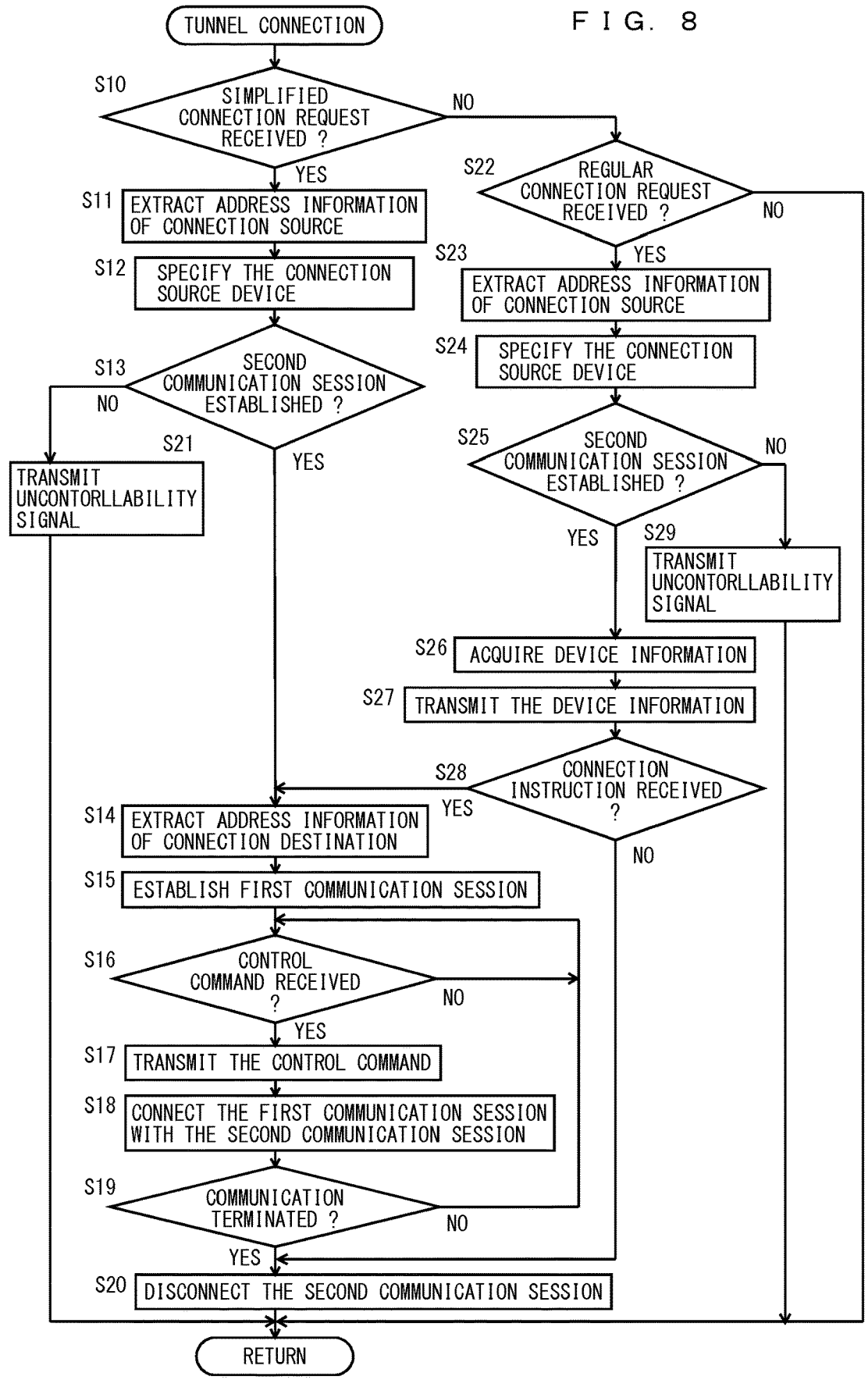
FIG. 8 is a flowchart illustrating an exemplary flow of a tunnel connection process.

FIG. 8 is a flowchart illustrating an exemplary flow of a tunnel connection process. The tunnel connection process is carried out in step S08 in FIG. 7. Referring to FIG. 8, in step S10, CPU 201 determines whether a simplified connection request has been received via the always-on session. If so, the process proceeds to step S11; otherwise, the process proceeds to step S22.

In step S11, CPU 201 extracts address information of a connection source, on the basis of a connection request included in the simplified connection request. CPU 201 then specifies the connection source device on the basis of the address information of the connection source (step S12). Here, it is assumed that the connection request includes address information of MFP 100 as the address information of the connection source, and address information of cloud server 400 as the address information specifying the connection destination. In this case, MFP 100 is specified as the connection source device.

In the following step S13, CPU 201 controls second communication portion 206 to establish a second communication session with MFP 100 specified as the connection source device. Specifically, CPU 201 transmits a communication session establishment request to MFP 100 specified as the connection source device in step S12, attempting to establish the second communication session with MFP 100. If the second communication session is established, the process proceeds to step S14. If the second communication session cannot be established with MFP 100, the process proceeds to step S21. The second communication session cannot be established with MFP 100, for example, when MFP 100 has not been turned on or when MFP 100 is unable to communicate because it is in trouble. In step S21, CPU 201 transmits an uncontrollability signal including that MFP 100 is uncontrollable, to management server 300 via the always-on session, and the process returns to the relay process.

In step S14, CPU 201 extracts the address information of the connection destination from the connection request included in the simplified connection request received in step S10. Here, the connection request includes the address information of cloud server 400 as the address information specifying the connection destination. Thus, CPU 201 extracts the address information of cloud server 400. In the following step S15, CPU 201 controls first communication portion 205 to establish a first communication session with cloud server 400 by using the address information of the connection destination. Specifically, CPU 201 accesses the address information of cloud server 400 extracted in step S14, to establish the first communication session with cloud server 400.

In step S16, CPU 201 determines whether a control command has been received. CPU 201 is in a standby mode until a control command is received (NO in step S16), and once the control command is received (YES in step S16), the process proceeds to step S17. Specifically, CPU 201 acquires a packet including a control command, from among the packets received from cloud server 400 via the first communication session. The control command is a command which is destined for MFP 100 from cloud server 400 so as to cause MFP 100 to execute a process. The control command specifies the process to be executed by MFP 100.

In step S17, CPU 201 transmits the control command to MFP 100, on behalf of cloud server 400, via the second communication session, and then the process proceeds to step S23. At this time, information indicating that the control command was transmitted from cloud server 400 is transmitted appended to the control command.

In step S18, CPU 201 uses the first and second communication sessions to relay a communication between cloud server 400 and MFP 100. For example, in the case where the control command is a command to process data, CPU 201 receives, via the first communication session, the data as a process target received together with the control command, and transmits the received data to MFP 100, on behalf of cloud server 400, via the second communication session. Further, in the case where an execution result is received from MFP 100 via the second communication session, CPU 201 transmits the execution result to cloud server 400, on behalf of MFP 10, via the first communication session. The execution result includes information indicating that it was transmitted from MFP 100.

In the following step S19, CPU 201 determines whether the communication has been terminated. For example, in the case where a communication end notification is received from cloud server 400 via the first communication session, CPU 201 determines that the communication has been terminated. If CPU 201 determines that the communication is terminated (YES in step S19), the process proceeds to step S20; otherwise, i.e. CPU 201 determines that the communication is not terminated (NO in step S19), the process returns to S16. In step S20, CPU 201 disconnects the second communication session established in step S20, and the process returns to the relay process.

In step S22, CPU 201 determines whether the regular connection request has been received via the always-on session. If CPU 201 receives the regular connection request, the process proceeds to step S23; otherwise, the process returns to the relay process.

In step S23, CPU 201 extracts the address information of the connection source on the basis of the connection request included in the regular connection request. CPU 201 then specifies a device of the connection source on the basis of the address information of the connection source (step S24). Here, it is assumed that the connection request includes address information of MFP 100 as the address information of the connection source, and address information of cloud server 400 as the address information specifying the connection destination. In this case, MFP 100 is specified as the device of the connection source device.

In the following step S25, CPU 201 controls second communication portion 206 to establish a second communication session with MFP 100 specified as the connection source device. Specifically, CPU 201 transmits a communication session establishment request to MFP 100 specified as the connection source device in step S23, attempting to establish the second communication session with MFP 100. If the second communication session is established, the process proceeds to step S26. If the second communication session cannot be established with MFP 100, the process proceeds to step S29. In step S29, CPU 201 transmits an uncontrollability signal indicating that MFP 100 is uncontrollable, to management server 300 via the always-on session, and the process returns to the relay process.

In step S26, CPU 201 acquires the device information from MFP 100 via the second communication session. In the following step S27, CPU 201 transmits the device identification information of MFP 100 to management server 300 via the always-on session, and the process proceeds to step S28.

In step S28, CPU 201 determines whether the connection instruction has been received. If CPU 201 receives the connection instruction from management server 300 via the always-on session, the process proceeds to step S14; otherwise, the process proceeds to step S20.

Figure 9:
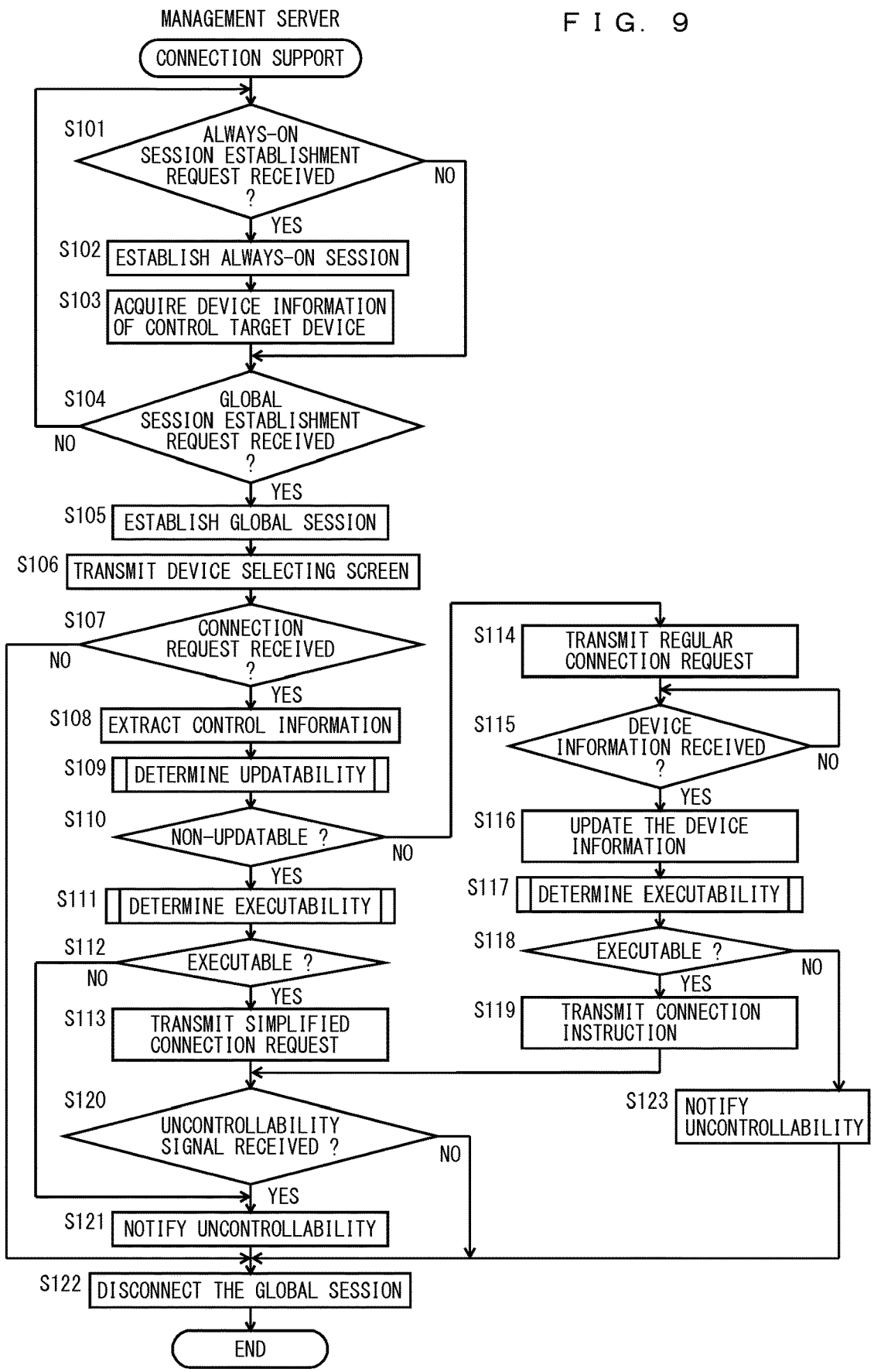
FIG. 9 is a flowchart illustrating an exemplary flow of a connection support process.

FIG. 9 is a flowchart illustrating an exemplary flow of a connection support process. The connection support process is carried out by CPU 301 included in management server 300 as CPU 301 executes a program stored in ROM 302, HDD 304, or CD-ROM 309A. Referring to FIG. 9, CPU 301 determines whether an always-on session establishment request has been received (step S101). Specifically, CPU 301 determines whether communication portion 305 has received, from gateway device 200, a request (always-on session establishment request) for establishment of a communication session for constant connection. If CPU 301 determines that the always-on session establishment request has been received, the process proceeds to step S102; otherwise, the process proceeds to step S104.

In step S102, CPU 301 establishes the always-on session with gateway device 200, and the process proceeds to step S103. In step S103, CPU 301 acquires device identification information of any of control target devices from gateway device 200 via the always-on session. Here, it is assumed that the device identification information of each of MFPs 100, 100A, and 100B is acquired.

In step S104, CPU 301 determines whether a global session establishment request has been received. Specifically, CPU 301 determines whether communication portion 305 has received a global session establishment request from cloud server 400 located outside the firewall. If so, the process proceeds to step S105; otherwise, the process returns to step S101. In step S105, CPU 301 establishes the global session with cloud server 400, and the process proceeds to step S106.

In step S106, CPU 301 transmits a device selecting screen to cloud server 400 via the global session. The device selecting screen is a screen which includes device identification information of gateway device 200 and device identification information of each of MFPs 100, 100A, and 100B, and on which gateway device 200 and one of MFPs 100, 100A, and 100B can be selected.

When cloud server 400 receives the device selecting screen, cloud server 400 can specify the device with which a tunnel connection is to be established. For example, cloud server 400 displays the device selecting screen on a display to cause a user who is operating cloud server 400 to select a device in accordance with the device selecting screen. Cloud server 400 then specifies the device selected by the user as the device with which cloud server 400 is to be connected. Here, it is assumed that the user operating cloud server 400 has selected gateway device 200 and MFP 100. In cloud server 400, when gateway device 200 and MFP 100 are selected as the devices to be connected, cloud server 400 transmits a connection request to management server 300 via the global session. The connection request includes address information of MFP 100 as the address information of the connection source, address information of cloud server 400 as the address information of the connection destination, and the control information. The address information of MFP 100 includes the device identification information of gateway device 200 and the device identification information of MFP 100. The address information of cloud server 400 is a URL used by MFP 100 to access cloud server 400. The URL includes an address (domain name) of cloud server 400, a Web page identifier, an identifier (job ID) of the job executed by cloud server 400, and a listening port number. The control information indicates contents of a process that a job specified by the job ID causes MFP as the control target device to execute.

In step S107, CPU 301 determines whether a connection request has been received from cloud server 400. If CPU 301 determines that a connection request is received (YES in step S107), the process proceeds to step S108; otherwise (NO in step S107), the process proceeds to S122. It is noted that, in the case where CPU 301 determines that the connection request is not received in step S107, it may preferably be a case where the connection request is not received during a period of a prescribed time, for example, a time-out period that elapses after the global session has been established in step S105.

In step S108, CPU 301 extracts control information included in the connection request. CPU 301 then executes an updatability determination process. The updatability determination process, which will be described in detail later, is a process of determining whether to update the device information of MFP 100 specified by the address information of the transmission source included in the connection request. In step S110, CPU 301 branches the process in accordance with an execution result in the updatability determining process. If the execution result is "non-updatable", the process proceeds to step S111; otherwise, the process proceeds to step S114.

In step S111, CPU 301 executes an executability determination process. The executability determination process, which will be described in detail later, is a process of determining whether MFP 100 specified by the address information of the transmission source included in the connection request received in step S107 is able to execute the process specified by the control information extracted in step S108. In step S112, CPU 301 branches the process in accordance with the execution result in the executability determination process. If the execution result is "executable", the process proceeds to step S113; otherwise, the process proceeds to step S121.

In step S113, CPU 301 transmits a simplified connection request to gateway device 200, via the always-on session established in step S101, and the process proceeds to step S120. The simplified connection request is a packet in which the connection request has been encapsulated so as to conform to the protocol determined by the always-on session. When gateway device 200 receives the simplified connection request, gateway device 200 attempts to establish a second communication session with MFP 100, establish a first communication session with cloud server 400, and relay the communications between MFP 100 and cloud server 400.

Meanwhile, in step S114, CPU 301 transmits a regular connection request to gateway device 200 via the always-on session established in step S101, and the process proceeds to step S115. The regular connection request is a packet in which the connection request has been encapsulated so as to conform to the protocol determined by the always-on session.

In step S115, CPU 301 determines whether the device information of MFP 100 as the control target device has been received from gateway device 200 via the always-on session established in step S101. CPU 301 is in a standby mode until the device information of MFP 100 is received (NO in step S115), and once the device information of MFP 100 is received (YES in step S115), the process proceeds to step S116. In step S116, CPU 301 updates the device information of MFP 100 with the device information received in step S115.

In the following step S117, CPU 301 executes the executability determination process on the basis of the updated device information. In the following step S118, CPU 301 branches the process in accordance with the execution result in the executability determination process executed in step S117. If the execution result is "executable", the process proceeds to step S119; otherwise, the process proceeds to step S123. In step S123, CPU 301 notifies cloud server 400 of "uncontrollable", via the global session established in step S105, and the process proceeds to step S122.

In step S119, CPU 301 transmits a connection instruction to gateway device 200 via the always-on session established in step S101, and the process proceeds to step S120. If gateway device 200 fails to establish the second communication session, gateway device 200 transmits an uncontrollability signal.

In step S120, CPU 301 determines whether the uncontrollability signal has been received from gateway device 200 via the always-on session established in step S101. If the uncontrollability signal is received, the process proceeds to step S121; otherwise, the process proceeds to step S122. In step S121, CPU 301 notifies cloud server 400 of "uncontrollable", via the global session established in step S105, and the process proceeds to step S122. In step S122, CPU 301 disconnects the global session established in step S105. The process is then terminated.

Figure 10:
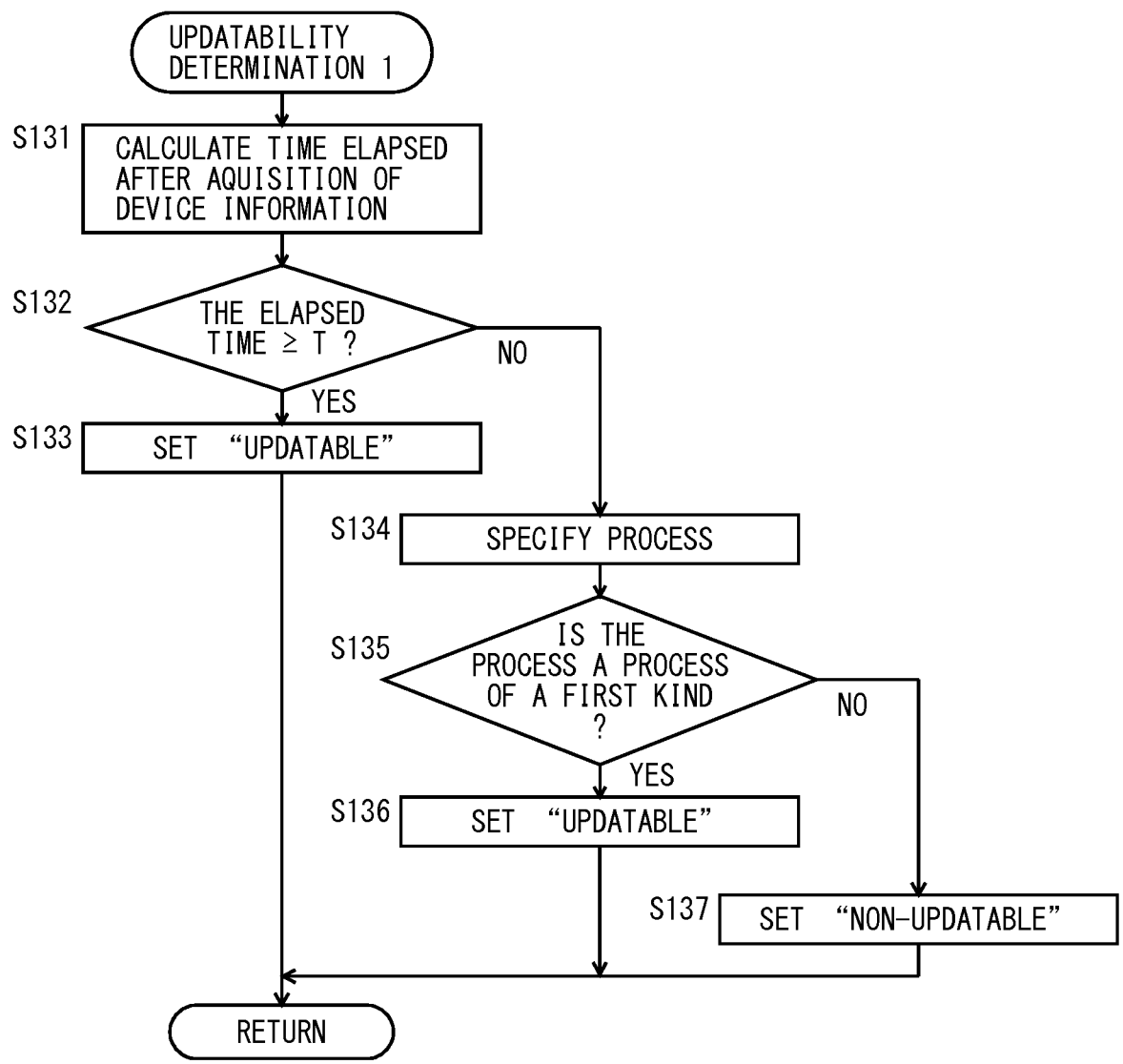
FIG. 10 is a flowchart illustrating an exemplary flow of an updatability determination process.

FIG. 10 is a flowchart illustrating an exemplary flow of an updatability determination process. The updatability determination process is carried out in step S111 of FIG. 9. Referring to FIG. 10, CPU 301 calculates the time that elapses after the device information of MFP 100 as the control target device is acquired (step S131). CPU 301 then compares the elapsed time with a threshold value T (step S132). If the elapsed time is equal to or more than the threshold value T, the process proceeds to step S133; otherwise the process proceeds to step S134. In step S133. CPU 301 sets "updatable" as a return value, and the process returns to the connection support process.

In step S134, CPU 301 specifies a process on the basis of the control information included in the connection request. CPU 301 then determines whether the specified process is a process of a first kind (step S135). If the specified process is a process of a first kind, the process proceeds to step S136; otherwise, the process proceeds to step S137. The process of a first kind includes, for example, a process of causing MFP 100 to form an image and a process of outputting a parameter set in MFP 100. In step S136, CPU 301 sets "updatable" as a return value, and the process returns to the connection support process. In step S137, CPU 301 sets "non-updatable" as a return value, and the process returns to the connection support process.

<Modification of Updatability Determination Process>

Figure 11:
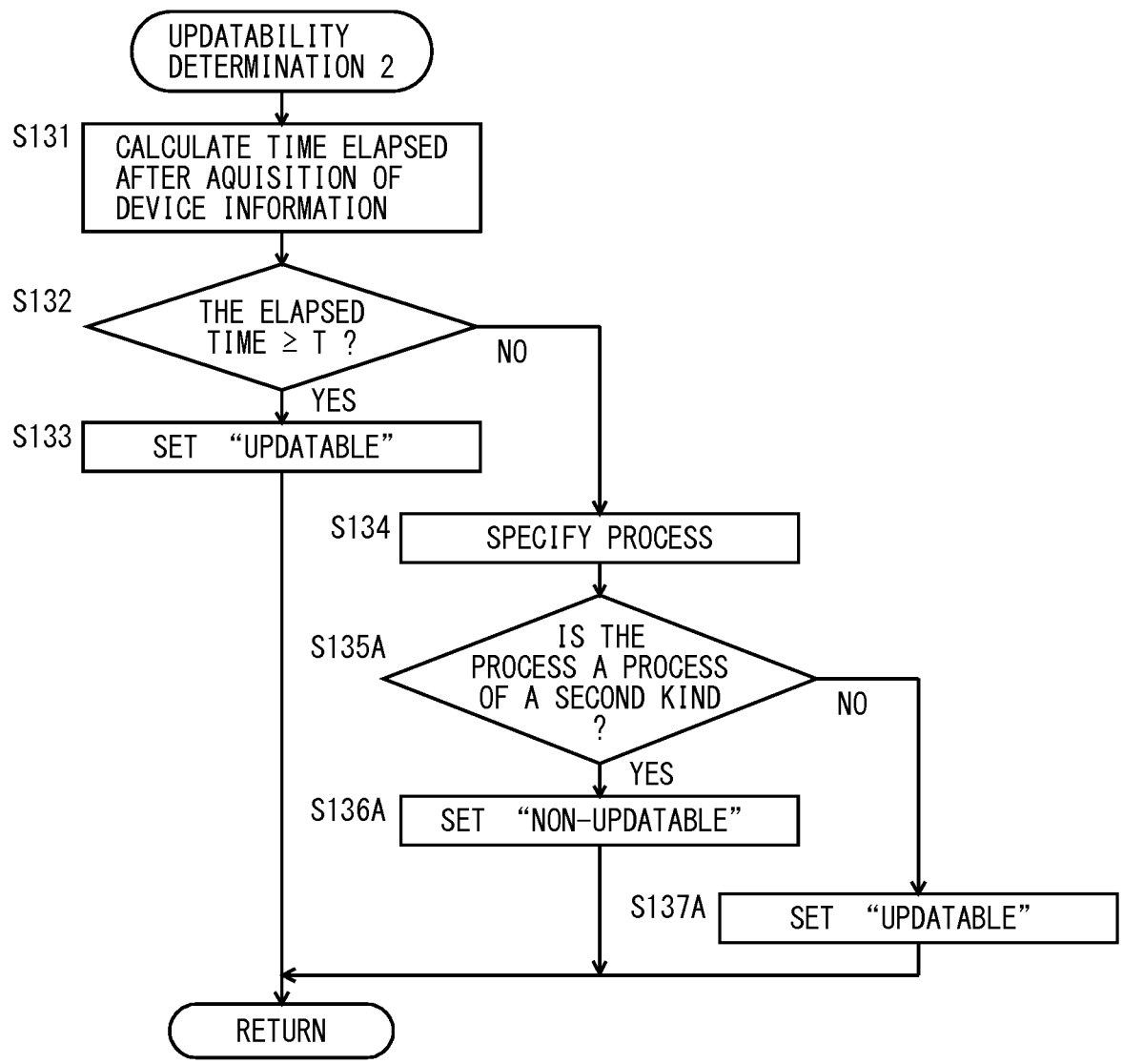
FIG. 11 is a flowchart illustrating an exemplary flow of an updatability determination process according to a modification.

FIG. 11 is a flowchart illustrating an exemplary flow of an updatability determination process in a modification. Referring to FIG. 11, a different point from FIG. 10 is that steps S135-S137 are denoted by steps S135A-S137A. Other processes are the same as processes illustrated in FIG. 10 and thus a detailed description thereof will not be repeated here.

In step S135A, CPU 301 determines whether the process specified in step S134 is a process of a second kind. If the specified process is a process of a second kind, the process proceeds to step S136A; otherwise, the process proceeds to step S137A. The process of a second kind includes a process of setting a parameter for MFP 100 as the control target device to execute the process. In step S136A, CPU 301 sets "non-updatable" as a return value, and the process returns to the connection support process. In step S137A, CPU 301 sets "updatable" as a return value, and the process returns to the connection support process.

Figure 12:
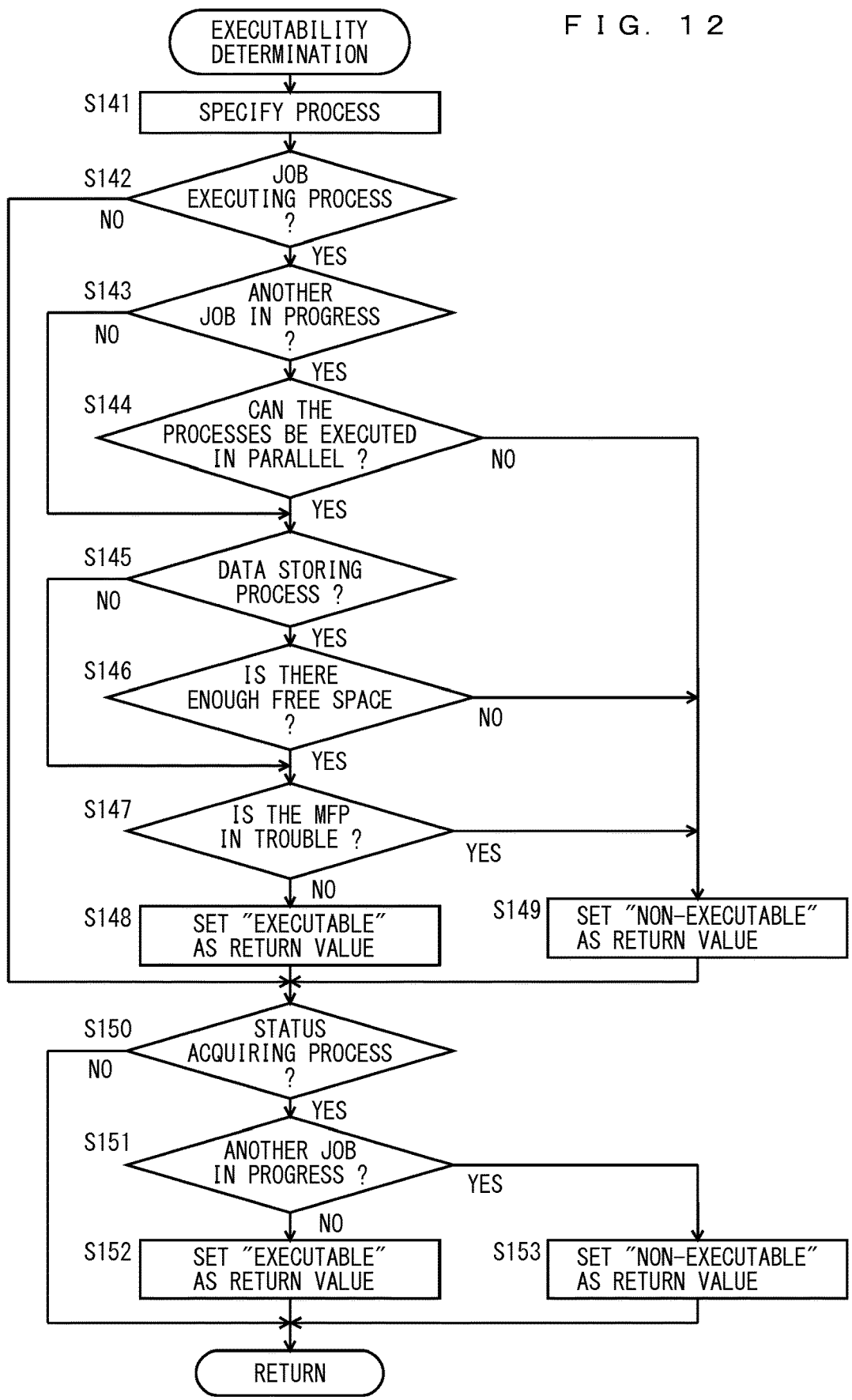
FIG. 12 is a flowchart illustrating an exemplary flow of an executability determination process

FIG. 12 is a flowchart illustrating an exemplary flow of an executability determination process. The executability determination process is carried out in step S111 and step S117 in the connection support process as illustrated in FIG. 9. The control information and device information of MFP 100 as the control target device are acquired before a stage where the executability determination process is executed.

Referring to FIG. 12, CPU 301 specifies a process on the basis of the control information (step S141). In the following step S142, CPU 301 determines whether the process specified in step S141 is a job execution process of instructing execution of a job. If the process is the job execution process, the process proceeds to step S143; otherwise, the process proceeds to step S150. In step S143, CPU 301 determines whether the control information indicates that a job is being executed in MFP 100. If so, the process proceeds to step S144; otherwise, the process proceeds to step S145.

In step S144, CPU 301 determines whether MFP 100 is able to execute the process specified in step S141 and the job being executed in MFP 100 specified by the device information in parallel. If MFP 100 is able to execute the two processes in parallel, the process proceeds to step S145; otherwise, the process proceeds to step S149. For example, in the case where the process specified in step S141 is a process of storing data into HDD 115, if the process being executed in MFP 100 is a process of forming an image in image forming portion 140, it is determined that the processes can be executed in parallel; whereas if the process being executed in MFP 100 is a process of storing a document read by document reading portion 130 into HDD 115, it is determined that the processes cannot be executed in parallel. A table in which processes that can be executed in parallel and processes that cannot be executed in parallel are defined may be acquired from MFP 100 in advance.

In step S145, CPU 301 determines whether the process specified in step S141 is a data storing process of storing data. If so, the process proceeds to step S146; otherwise, the process proceeds to step S147, with step S146 being skipped. In step S146, CPU 301 refers to the device information of MFP 100 to determine whether HDD 115 in MFP 100 has free space enough to store the data. If so, the process proceeds to step S147; otherwise, the process proceeds to step S149.

In step S147, CPU 301 refers to the device information of MFP 100 to determine whether MFP 100 is in trouble. Here, it is determined whether there has occurred a trouble that makes MFP 100 unable to execute the process specified in step S141. For example, in the case where the process specified in step S141 is an image forming process, it is determined that a trouble has occurred when MFP 100 has run out of paper or suffered a paper jam. If MFP 100 is in trouble, the process proceeds to step S148; otherwise, the process proceeds to step S149.

In step S148, CPU 301 sets "executable" as a return value, and the process proceeds to step S150. On the other hand, in step S149, CPU 301 sets "non-executable" as the return value, and the process proceeds to step S150.

In step S150, CPU 301 determines whether the process specified in step S141 is a status acquiring process of acquiring the statuses of MFP 100. If so, the process proceeds to step S151; otherwise, the process returns to the relay process. In step S151, CPU 301 determines whether the device information indicates that a job is being executed in MFP 100. If so, the process proceeds to step S152; otherwise, the process proceeds to step S153. In step S152, CPU 301 sets "executable" as the return value, and the process returns to the connection support process. On the other hand, in step S153, CPU 301 sets "non-executable" as the return value, and the process returns to the connection support process.

Figure 13:
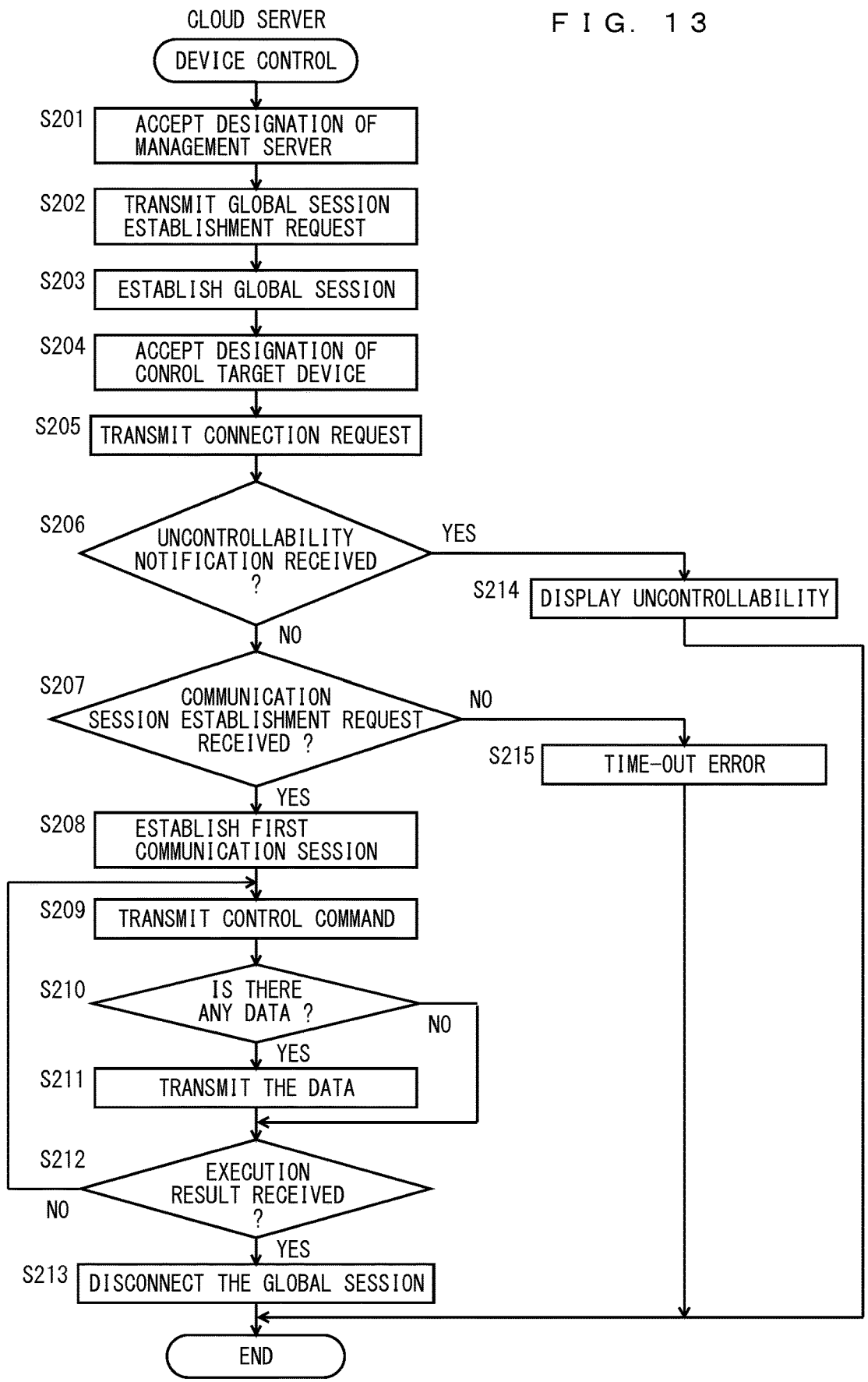
FIG. 13 is a flowchart illustrating an exemplary flow of a device control process.

FIG. 13 is a flowchart illustrating an exemplary flow of a device control process. The device control process is carried out by a CPU included in cloud server 400 as the CPU executes a program for providing a service. Here, among the processes executed by cloud server 400, the process in which cloud server 400 causes MFP 100 to execute a process will be described primarily. Referring to FIG. 13, the CPU included in cloud server 400 accepts designation of a management server (step S201). Specifically, the CPU accepts the global IP address of management server 300 that a user inputs for designating MFP 100.

In the following step S202, the CPU transmits an establishment request for a global session with management server 300 designated in step S201. In the following step S203, the CPU negotiates with management server 300 to establish the global session as the communication session with management server 300. In this case, management server 300 may request authentication information for authenticating the user registered in management server 300, and it may establish the global session as the communication session on the condition that the authentication has been successful. With this configuration, the users who can access MFPs 100, 100A, and 100B located inside the firewall can be restricted to the users registered in management server 300.

In the following step S204, the CPU accepts designation of a control target device. The CPU displays a device selecting screen received from management server 300 via the global session, and specifies the device identification information of the device that has been selected as a target device which allows the user who operates cloud server 400 to execute a process. The device selecting screen is a screen which includes device identification information of gateway device 200 and device identification information of each of MFPs 100, 100A, and 100B, and on which gateway device 200 and one of MFPs 100, 100A, and 100B can be selected. Here, it is assumed that MFP 100 has been selected as a control target device.

In the following step S205, the CPU transmits a connection request to management server 300, via the global session established in step S203. The connection request includes address information of MFP 100 as the address information of the transmission source and a URL as the address information of the transmission destination. The URL includes an address (domain name) of cloud server 400, a Web page identifier, an identifier (job ID) of the job executed by cloud server 400, a listening port number, and control information.

In step S206, the CPU determines whether an uncontrollability notification has been received from management server 300 via the global session. If the uncontrollability notification has been received, the process proceeds to step S214; otherwise, the process proceeds to step S207. In step S214, the CPU notifies the user that MFP 100 designated as the control target device in step S204 is uncontrollable.

In step S207, the CPU determines whether a communication session establishment request has been received. The establishment request here corresponds to the connection request. More specifically, the establishment request is an access to the URL included in the connection request. If the communication session establishment request has been received, the process proceeds to step S208; otherwise, the process proceeds to step S215. In step S215, the CPU notifies the user of a time-out error, and the process is terminated.

In step S208, the CPU establishes a first communication session corresponding to the communication session establishment request, and the process proceeds to step S209. In step S209, the CPU transmits a control command via the first communication session. While the destination of the control command is gateway device 200, the data transmitted via the first communication session is transmitted to MFP 100 by gateway device 200, via the second communication session established between gateway device 200 and MFP 100, as explained above. Therefore, the control command is actually transmitted to MFP 100.

In the following step S210, the CPU determines whether there is data to be transmitted to MFP 100. For example, in the case where the control command indicates a process of updating firmware, there is an updating program as the data. In the case where the control command indicates a process of storing data, there is the data to be stored. If there is such data, the process proceeds to step S211; otherwise, the process proceeds to step S212. In step S211, the CPU transmits the data via the first communication session, and the process proceeds to step S212. While the destination of the data is gateway device 200, as with the control command, the data is actually transmitted to MFP 100.

In step S212, the CPU determines whether an execution result has been received via the first communication session. If so, the CPU displays the received execution result on the client terminal connected to cloud server 400, and the process proceeds to step S213; otherwise, the process returns to step S209. This makes it possible to notify the user operating cloud server 400 of the result of the process that has been executed in MFP 100 based on the control command. In step S213, the CPU disconnects the global session established in step S203. The process is then terminated.

As described above, gateway device 200 according to the present embodiment functions as a relay device which is disposed inside the firewall and which relays a communication between MFP 100 disposed inside the firewall and cloud server 400 located outside the firewall. In relaying the communication between cloud server 400 and MFP 100, gateway device 200 acquires device information from MFP 100 and, on the basis of the acquired device information, determines whether MFP 100 is able to execute a process that is specified by a control command transmitted from cloud server 400 destined for MFP 100. When gateway device 200 determines that MFP 100 is unable to execute the process, gateway device 200 temporarily stores the control command. Thereafter, when gateway device 200 determines, on the basis of the device information acquired from MFP 100 after the control command has been temporarily stored, that MFP 100 is able to execute the process, gateway device 200 transmits the temporarily stored control command to MFP 100, on behalf of cloud server 400. With this configuration, when MFP 100 is unable to execute the process specified by the control command, gateway device 200 refrains from transmitting the control command. This eliminates the need for MFP 100 to perform a process corresponding to the control command, which suppresses an increase of the load. Further, cloud server 400 can transmit the control command, irrespective of whether MFP 100 is able to execute the process or not. Cloud server 400 does not need to perform a process for determining the statuses of MFP 100, which suppresses an increase of the load. As a result, it is possible to improve the efficiency of the communication between cloud server 400 and MFP 100 via the firewall.

As described above, management server 300 according to the present embodiment is disposed outside a firewall and capable of supporting connection of communications between MFP 100 disposed inside the firewall and cloud server 400 disposed outside the firewall. Further, management server 300 is operable, on the basis of a request from gateway device 200, to establish an always-on connection session for communicating with gateway device 200, acquire the device information of MFP 100 when the always-on connection session with gateway device 200 is established, determine whether to update the device information in response to reception of the connection request from cloud server 400, and acquire the device information from gateway device 200 after it is determined to update the device information. Therefore, in the case where it is determined that the device information is not updated, it is not necessary to acquire the device information from gateway device 200. This can reduce the time that elapses after the connection request is received from cloud server 400 until MFP 100 is connected to cloud server 400.

Further, management server 300 is operable, on the basis of the control information indicating contents to control MFP 100, included in the connection request, to determine updatability, and thus it is possible to acquire the latest device information necessary to determine the executability of a process to be executed by MFP 100.

Furthermore, management server 300 is operable, in the case where the control information indicates contents of a predetermined process of a first kind to be executed by MFP 100, to determine to update the device information, and thus it is possible to acquire the latest device information only in the case where the process of a first kind is executed by MFP 100.

Furthermore, management server 300 is operable, in the case where the control information indicates contents of a predetermined process of a second kind to be executed by MFP 100, to determine not to update the device information, and thus it is possible not to acquire the latest device information only in the case where the process of a second kind is executed by MFP 100.

Furthermore, management server 300 is operable, on the basis of the time that elapses after the device information is acquired as final, to determine updatability, and thus it is possible not to update a piece of the device information with a short elapsed time among a plurality of pieces of the device information which change according to a elapsed time.

Furthermore, management server 300 is operable, in the case where the time that elapses after the device information is acquired as final is within a prescribed time, to determine not to update the device information, and thus it is possible not to update the device information which is acquired after the prescribed time has elapsed.

Furthermore, management server 300 is operable, in the case where it is determined not to update the control information, to transmit a simplified connection request to gateway device 200, in the case where it is determined to update the control information, to transmit a regular connection request to gateway device 200, and to acquire the device information transmitted by gateway device 200 which receives the regular connection request. Therefore, management server 300 is able to control whether gateway device 200 transmits the device information.

Meanwhile, gateway device 200 establishes an always-on session with management server 300, and receives, via the always-on session, a connection request that management server 300 receives from cloud server 400. Gateway device 200 establishes the first communication session using address information of cloud server 400 as the connection destination, which is included in the received connection request. Gateway device 200 also establishes the second communication session with MFP 100 which is specified by address information of MFP 100 as the connection source, which is included in the received connection request. This enables a communication between cloud server 400 and MFP 100 as the control target device, via the firewall.

Further, gateway device 200 is operable, in response to reception of the regular connection request from management server 300 via the always-on session established with management server 300, to acquire the device information from MFP 100 specified by said regular connection request via a second connection session. Therefore, management server 300 is able to allow gateway device 200 to acquire the latest device information.

Furthermore, gateway device 200 is operable, when receiving the regular connection request from management server 300, to establish a first connection session, after transmitting the device information to management server 300, on the condition where the connection instruction is received from management server 300, and thus management server 300 is able to control the timing in which gateway device 200 establishes the first communication session.

Further, management server 300 determines, on the basis of the device information, whether MFP 100 is able to execute a process specified in the control information. In the case where it is determined that the device information is updated, management server 300 determines the executability on the basis of the device information acquired thereafter, and in the case where it is determined that the device information is not updated, management server 300 determines the executability on the basis of the device information acquired before the connection request is received from cloud server 400. Therefore, it is possible to determine whether MFP 100 is able to execute, on the basis of appropriate device information.

Preferably, management server 300 transmits a simplified connection request in the case where MFP 100 is able to execute a process specified in the device information, and thus it is possible to establish a communication connection between MFP 100 and cloud server 400 without fail.

Further, management server 300 is operable, in the case where it is determined that the device information is updated, to determine the executability on the basis of the device information acquired after the connection request has been received from cloud server 400, and in the case where it is determined that the device information is not updated, to determine the executability on the basis of the device information acquired before the connection request is received from cloud server 400. Therefore, in the case where it is determined that the device information is not updated, it is not necessary to acquire the device information from a relay device, and thus this can reduce the time that elapses after the connection request is received from the cloud server until the control target device is connected to the cloud server.

Further, management server 300 is operable, in the case where it is determined that MFP 100 is not able to execute a process specified in the control information, to notify cloud server 400 of "non-executable", and thus it is possible to notify the user who operates cloud server 400 that the process is not executed by MFP 100.

Further, MFP 100 is an image forming apparatus including gateway device 200, and gateway device 200 establishes the second communication session with an MFP which is selected by the user operating cloud server 400 from among MFP 100 and other MFPs 100A and 100B disposed inside the firewall, and relays a communication between cloud server 400 and the selected MFP. Therefore, it is possible to improve the efficiency of the communication between cloud server 400 and one of MFPs 100, 100A, and 100B disposed inside the firewall.

While management server 300 has been described as an example in the above embodiment, the present invention can of course be specified as a connection support method for causing management server 300 to perform the connection support process shown in FIGS. 9 to 12, or as a connection support program for causing CPU 301 controlling management server 300 to perform the connection support method.

Although the present invention has been described and illustrated in detail, it is clearly understood that the same is by way of illustration and example only and is not to be taken by way of limitation, the spirit and scope of the present invention being limited only by the terms of the appended claims.

APPENDIX (1) The management server according to claim 3, wherein a process of a first kind is a process of causing the control target device to form an image.

(2) The management server according to claim 3, wherein a process of a first kind is a process of outputting a value indicating a status of the control target device.

(3) The management server according to claim 4, wherein a process of a second kind is a process of setting a parameter for the control target device to execute a process.

What is claimed is:

1. A management server disposed outside a firewall and capable of supporting connection of communications between an image processing target device disposed inside the firewall and a cloud server disposed outside the firewall, the management server comprising:
    a hardware processor configured to:
        establish, on the basis of a request from a relay device disposed inside said firewall, a communication session with said relay device;
        acquire device information including status information indicating a status of said image processing target device from said relay device via said established communication session, the acquired status information including ability information for the image processing target device to specify a type of a process and operation information indicating current operation at the image processing target device; and
        determine updatability of, in response to reception of a connection request of connecting to said image processing target device from said cloud server, said device information based on the type of the process to be executed by said image processing target device as specified in control information included in said connection request,
said acquiring of said device information including acquiring said device information from said relay device upon establishment of a communication session with said relay device by said establishing, and acquiring said device information from said relay device after it is determined to update;
transmit to said relay device a simplified connection request of establishing a tunnel connection to said image processing target device without updating said device information in the case where it is determined not to update; and
transmit to said relay device a regular connection request of establishing a tunnel connection to said image processing target device after said device information is updated in the case where it is determined to update,
wherein said acquiring of said device information includes acquiring said device information transmitted by said relay device receiving said regular connection request.

2. The management server according to claim 1, wherein said hardware processor is further configured to determine updatability, based on said control information indicating contents to control said image processing target device and being included in a connection request received from said cloud server.

3. The management server according to claim 2, wherein said hardware processor, when determining updatability, determines to update said device information in the case where said control information indicates contents to cause said image processing target device to execute a predetermined process of a first kind.

4. The management server according to claim 2, wherein said hardware processor, when determining updatability, determines not to update said device information in the case where said control information indicates contents to cause said image processing target device to execute a predetermined process of a second kind.

5. The management server according to claim 1, wherein said hardware processor is further configured to determine updatability, based on the time that elapses after said device information is acquired as final.

6. The management server according to claim 5, wherein said hardware processor, when determining updatability, determines not to update in the case where the time that elapses after said device information is acquired as final is within a prescribed time.

7. The management server according to claim 1, wherein said relay device further includes a hardware processor configured to:
establish a first communication session with said cloud server;
establish a second communication session with said image processing target device;
relay communications between said cloud server and said image processing target device, using said first and second communication sessions; and
acquiring, in response to reception of said regular connection request via said established communication session with said management server, said device information via said second communication session from said image processing target device specified by said regular connection request.

8. The management server according to claim 7, wherein
in response to reception of said simplified connection request from said management server, establishing said first communication session, and
in the case where said regular connection request is received from said management server, establishing said first communication session on condition that a connection instruction is received from said management server after said device information has been transmitted.

9. The management server according to claim 1,
the management server hardware processor being further configured to determine whether said image processing target device is able to execute a process specified by said control information, on the basis of contents of the process to be executed by said image processing target device and being indicated on said control information and said acquired status information including the operation information indicating the current operation at the image processing target device, and
updating said device information on the basis of said device information newly acquired from said relay device in a case where it is determined to update,
in the case where it is determined to update, said determining determines the executability on the basis of said device information after updating, and
in the case where it is determined not to update, said determining determines the executability on the basis of the device information before updating.

10. The management server according to claim 9, wherein in the case where it is determined not to update, transmitting said simplified connection request for establishing a tunnel connection between said image processing target device and said cloud server is transmitted to said relay device without updating said device information on condition that it is determined to be executable.

11. The management server according to claim 9, wherein in the case where it is determined to update, a connection instruction for establishing a tunnel connection between said image processing target device and said cloud server is transmitted to said relay device on condition that it is determined to be executable.

12. The management server according to claim 1, wherein the hardware processor is configured to:
determine to update said device information if said type of the process is a first type of a process that is at least one of causing said image processing device to form an image and outputting a parameter set in said image processing device, and
determine not to update said device information if said type of the process is a second type of a process that is setting a parameter for causing the image processing device to execute a process.

13. A management server disposed outside a firewall and capable of supporting connection of communications between an image processing target device disposed inside the firewall and a cloud server disposed outside the firewall, the management server comprising:
a hardware processor configured to:
acquire device information including status information indicating a status of said image processing target device from a relay device disposed inside the firewall;
determine, on the basis of said status information of said acquired device information, executability of a process specified by control information indicating contents to control said image processing target device and being included in a connection request received from said cloud server, the acquired status information including ability information for the image processing target device to specify a type of a process and operation information indicating current operation at the image processing target device; and
determine whether to update said device information at a stage before the executability is determined, wherein
in the case where it is determined to update, said determining-determines the executability on the basis of the status information included in said acquired device information after said connection request has been received from said cloud server, and
in the case where it is determined not to update, said determining determines the executability on the basis of the status information included in the acquired device information before said connection request is received from said cloud server;
transmit to said relay device a simplified connection request of establishing a tunnel connection to said image processing target device without updating said device information in the case where it is determined not to update; and
transmit to said relay device a regular connection request of establishing a tunnel connection to said image processing target device after said device information is updated in the case where it is determined to update, wherein said acquiring of said device information includes acquiring said device information transmitted by said relay device receiving said regular connection request.

14. A connection support method performed by a management server disposed outside a firewall and capable of supporting connection of communications between an image processing target device disposed inside the firewall and a cloud server disposed outside the firewall, the method comprising:
a server-side session establishing step of, on the basis of a request from a relay device disposed inside said firewall, establishing a communication session with said relay device;
a device information acquiring step of acquiring device information including status information indicating a status of said image processing target device from said relay device via said established communication session, the acquired status information including ability information for the image processing target device to specify a type of a process and operation information indicating current operation at the image processing target device; and
an update determining step of, in response to reception of a connection request of connecting to said image processing target device from said cloud server, determining whether to update said device information based on the type of the process to be executed by said image processing target device as specified in control information included in said connection request,
said device information acquiring step including an upon-session-establishment acquiring step of acquiring said device information from said relay device upon establishment of a communication session with said relay device in said server-side session establishing step, and
an upon-session-request acquiring step of acquiring said device information from said relay device after it is determined in said update determining step to update;
a simplified connection request step of transmitting to said relay device a simplified connection request of establishing a tunnel connection to said image processing target control device without updating said device information in the case where it is determined not to update in said update determining step; and
a regular connection request step of transmitting to said relay device a regular connection request of establishing a tunnel connection to said image processing target control device after said device information is updated in the case where it is determined to update in said update determining step, wherein
said upon-session-request acquiring step includes a step of acquiring device information transmitted by said relay device receiving said regular connection request.

15. The connection support method according to claim 14, further comprising:
a simplified connection request step of transmitting to said relay device a simplified connection request of establishing a tunnel connection to said image processing target device without updating said device information in the case where it is determined not to update in said update determining step; and
a regular connection request step of transmitting to said relay device a regular connection request of establishing a tunnel connection to said image processing target device after said device information is updated in the case where it is determined to update in said update determining step, wherein
said upon-session-request acquiring step includes a step of acquiring device information transmitted by said relay device receiving said regular connection request.

16. The connection support method according to claim 15, further comprising a step of causing said relay device to perform:
a first session establishing step of establishing a first communication session with said cloud server;
a second session establishing step of establishing a second communication session with said image processing target device;
a relay step of relaying communications between said cloud server and said image processing target device, using said first and second communication sessions; and
a device-side acquiring step of, in response to reception of said regular connection request via said established communication session with said management server, acquiring said device information via said second communication session from said image processing target device specified by said regular connection request.

17. The connection support method according to claim 16, wherein said first session establishing step includes,
a step of, in response to reception of said simplified connection request from said management server, establishing said first communication session, and
a step of, in the case where said regular connection request is received from said management server, establishing said first communication session on condition that a connection instruction is received from said management server after said device information has been transmitted in said device-side acquiring step.

18. The connection support method according to claim 14, wherein the device information includes status information indicating a status of said image processing target device,
the method further comprising an executability determining step to determine whether said image processing target device is able to execute a process specified by said control information, on the basis of contents of the process to be executed by said image processing target device and being indicated on said control information and said status information acquired by said device information acquiring portion, and an updating step to update said device information on the basis of said device information newly acquired from said relay device in a case where it is determined by said update determining step to update, in the case where it is determined by said update determining step to update, said executability determining step determines the executability on the basis of said device information after updating, and in the case where it is determined by said update determining step not to update, said executability determining step determines the executability on the basis of the device information before updating.

19. The connection support method according to claim 14, wherein in the case where it is determined by said update determining step not to update, a simplified connection request for establishing a tunnel connection between said image processing target device and said cloud server is transmitted to said relay device without updating said device information on condition that it is determined by said executability determining step to be executable.

20. The connection support method according to claim 14, wherein in the case where it is determined by said update determining step to update, a connection instruction for establishing a tunnel connection between said image processing target device and said cloud server is transmitted to said relay device on condition that it is determined by said executability step to be executable.

21. The connection support method according to claim 14, the method comprising:

determining to update said device information if said type of the process is a first type of a process that is at least one of causing said image processing device to form an image and outputting a parameter set in said image processing device, and determining not to update said device information if said type of the process is a second type of a process that is setting a parameter for causing the image processing device to execute a process.

22. A non-transitory computer-readable recording medium encoded with a connection support program executed by a computer controlling a management server, wherein the connection support program causes the computer to perform the method comprising:

a server-side session establishing step of, on the basis of a request from a relay device disposed inside said firewall, establishing a communication session with said relay device;

a device information acquiring step of acquiring device information including status information indicating a status of said image processing target device from said relay device via said established communication session, the acquired status information including ability information for the image processing target device to specify a type of a process and operation information indicating current operation at the image processing target device; and an update determining step of, in response to reception of a connection request of connecting to said image processing target device from said cloud server, determining whether to update said device information based on the type of the process to be executed by said image processing target device as specified in control information included in said connection request, said device information acquiring step including an upon-session-establishment acquiring step of acquiring said device information from said relay device upon establishment of a communication session with said relay device in said server-side session establishing step, and an upon-session-request acquiring step of acquiring said device information from said relay device after it is determined in said update determining step to update;

a simplified connection request step of transmitting to said relay device a simplified connection request of establishing a tunnel connection to said image processing target control device without updating said device information in the case where it is determined not to update in said update determining step; and a regular connection request step of transmitting to said relay device a regular connection request of establishing a tunnel connection to said image processing target control device after said device information is updated in the case where it is determined to update in said update determining step, wherein said upon-session-request acquiring step includes a step of acquiring device information transmitted by said relay device receiving said regular connection request.

23. A connection support method performed by a management server disposed outside a firewall and capable of supporting connection of communications between an image processing target device disposed inside the firewall and a cloud server disposed outside the firewall, the method comprising:

a device information acquiring step of acquiring device information including status information indicating status of said image processing target device from a relay device disposed inside the firewall;

an executability determining step of determining the executability of a process specified by control information indicating contents to control said image processing target device and being included in a connection request from said cloud server, on the basis of said status information of said device information acquired in said device information acquiring step, the acquired status information including ability information for the image processing target device to specify a type of a process and operation information indicating current operation at the image processing target device; and an update determining step of determining whether to update said device information at a stage before the executability is determined in said executability determining step, wherein said executability determining step includes a step of determining, in the case where it is determined to update in said update determining step, the executability on the basis of the status information included in said device information acquired in said device information acquiring step after said connection request has been received from said cloud server, and said executability determining step includes a step of determining, in the case where it is determined not to update in said update determining step, the executability on the basis of the status information included in said device information acquired in said device information acquiring step before said connection request is received from said cloud server;

transmit to said relay device a simplified connection request of establishing a tunnel connection to said image processing target device without updating said device information in the case where it is determined not to update; and transmit to said relay device a regular connection request of establishing a tunnel connection to said image processing target device after said device information is updated in the case where it is determined to update, wherein said acquiring of said device information includes acquiring said device information transmitted by said relay device receiving said regular connection request.

24. A non-transitory computer-readable recording medium encoded with a connection support program executed by a computer controlling a management server, wherein the connection support program causes the computer to perform the method comprising:

a device information acquiring step of acquiring device information including status information indicating status of said image processing target device from a relay device disposed inside the firewall;

an executability determining step of determining the executability of a process specified by control information indicating contents to control said image processing target device and being included in a connection request from said cloud server, on the basis of said status information of said device information acquired in said device information acquiring step, the acquired status information including ability information for the image processing target device to specify a type of a process and operation information indicating current operation at the image processing target device; and an update determining step of determining whether to update said device information at a stage before the executability is determined in said executability determining step, wherein said executability determining step includes a step of determining, in the case where it is determined to update in said update determining step, the executability on the basis of the status information included in said device information acquired in said device information acquiring step after said connection request has been received from said cloud server, and said executability determining step includes a step of determining, in the case where it is determined not to update in said update determining step, the executability on the basis of the status information included in said device information acquired in said device information acquiring step before said connection request is received from said cloud server;

transmit to said relay device a simplified connection request of establishing a tunnel connection to said image processing target device without updating said device information in the case where it is determined not to update; and transmit to said relay device a regular connection request of establishing a tunnel connection to said image processing target device after said device information is updated in the case where it is determined to update, wherein said acquiring of said device information includes acquiring said device information transmitted by said relay device receiving said regular connection request.

* * * * *